United States Patent [19]

Schermerhorn

[11] 3,840,779

[45] Oct. 8, 1974

[54] CIRCUITS FOR DRIVING AND ADDRESSING GAS DISCHARGE PANELS BY INVERSION TECHNIQUES

[75] Inventor: Jerry D. Schermerhorn, Swanton, Ohio

[73] Assignee: Owens-Illinois, Inc., Toledo, Ohio

[22] Filed: June 22, 1973

[21] Appl. No.: 372,549

[52] U.S. Cl. ....... 315/169 R, 315/166, 315/169 TV

[51] Int. Cl. .......... H05b 37/00

[58] Field of Search . 315/165, 166, 169 R, 169 TV; 340/324 M

[56] References Cited

UNITED STATES PATENTS

| | | | |
|---|---|---|---|
| 3,654,388 | 4/1972 | Slottow et al. | 315/169 R X |
| 3,742,294 | 6/1973 | Wojcik | 315/169 TV |
| 3,749,970 | 7/1973 | Schmersal | 315/169 R |
| 3,771,016 | 11/1973 | Toba et al. | 315/169 TV |

*Primary Examiner*—Herman Karl Saalbach
*Assistant Examiner*—Eugene R. LaRoche
*Attorney, Agent, or Firm*—Donald Keith Wedding

[57] ABSTRACT

Opposed electrode arrays are driven from busses on which assymetric, periodic pulsating, sustainer voltage components are imposed by pull-up, pull-down and pull to ground circuits to energize display/memory gas discharge panels made up of a plurality of discharge cells, each cell including proximate electrode portions of at least one electrode in each opposed array. A pull-up buss and a pull-down buss is provided for each electrode array and each is coupled to each electrode of the array by isolation diodes. The device is subjected to electronic inversion of the discharge states of its cells by selective activation of the pull-up and pull-down circuits whereby the resultant alternating sustainer voltage established across the cells for one set of applied substainer component wave forms defines an "off state" cell wall voltage level essentially at the cell wall voltage of a discharged cell in the "on state" cell wall voltage of a discharged cell for the one set of applied sustainer component wave forms is essentially at the off state cell wall voltage level for the second set of applied sustainer components. Signals for selectively manipulating the discharge state of each cell are applied to the electrodes of the cell by address pulsers comprising pull-to-ground circuits each of which functions for at least one electrode in each array. Pre-address pulsers reduce the bus potentials to minimize the power requirements on the address pulsers. Buss potential sensing circuits enable addressing of cells only when predetermined buss potentials are achieved. Circuits are provided to compensate for interconductor capacitance effects in the panel.

36 Claims, 9 Drawing Figures

CIRCUITS FOR DRIVING AND ADDRESSING GAS DISCHARGE PANELS BY INVERSION TECHNIQUES

RELATED APPLICATIONS

This application is related to applications for United States Letters Patent filed herewith in the name of Jerry D. Schermerhorn entitled "Method of Driving and Addressing Gas Discharge Panels by Inversion Techniques", Ser. No. 372,553, "Spatial Discharge Transfer Gaseous Discharge Display/Memory Panel", Ser. No. 372,730, and "Method of Introducing Logic Into Display/Memory Gaseous Discharge Panels by Spatial Discharge Transfer", Ser. No. 372,542, and an application for United States Letters Patent, Ser. No. 372,543 filed herewith in the names of Michael E. Fein and Jerry D. Schermerhorn entitled "Electronic Conditioning of Gas Discharge Panels by Inversion Interval Extension".

BACKGROUND OF THE INVENTION

1. Field of the Invention

This invention relates to circuits for controlling gas discharge devices, especially multiple gas discharge display/memory devices which have an electrical memory and which are capable of producing a visual display or representation of data.

2. Description of the Prior Art

Heretofore, multiple gas discharge display and/or memory panels have been proposed in the form of a pair of opposed dielectric charge storage members which are backed by electrodes, the electrodes being so formed and oriented with respect to an ionizable gaseous medium as to define a plurality of discrete gas discharge units or cells. The cells have been defined by surrounding or confining physical structure such as the walls of apertures in a perforated glass plate sandwiched between glass surfaces and they have been defined in an open space between glass or other dielectric backed by conductive electrode surfaces by appropriate choices of the gaseous medium, its pressure and the electrode geometry. In either structure, charges (electrons and ions) produced upon ionization of the gas volume of a selected discharge cell, when proper alternating operating voltages are applied between the opposed electrodes, are collected upon the surface of the dielectric at specifically defined locations and constitute an electrical field opposing the electrical field which created them so as to reduce the voltage and terminate the discharge for the remainder of the cycle portion during which the discharge producing polarity remains applied. These collected charges aid an applied voltage of the polarity opposite that which created them so that they aid in the initiation of a discharge by imposing a total voltage across the gas sufficient to again initiate a discharge and a collection of charges. This repetitive and alternating charge collection and ionization discharge constitutes an electrical memory.

An example of a panel structure containing non-physically-isolated or open discharge cells is disclosed in U.S. Pat. No. 3,499,167 issued to Theodore C. Baker, et al. Physically isolated cells have been disclosed in the article by D. L. Bitzer and H. G. Slottow entitled "The Plasma Display Panel — A Digitally Addressable Display With Inherent Memory" Proceeding of the Fall Joint Computer Conference, I E E E, San Francisco, Cal., November 1966, pp 541–547 and in U.S. Pat. No. 3,559,190.

One construction of a memory/display panel includes a continuous volume of ionizable gas confined between a pair of dielectric surfaces backed by conductor arrays, typically in parallel lines with the arrays of lines orthogonally related, to define in the region of the projected intersections, as viewed along the common perpendicular to each array, a plurality of opposed pairs of charge storage areas on the surfaces of the dielectric bounding or confining the gas. Many variations of the individual conductor form, the array form, their relationship to each other and to the dielectric and gas are available, hence the orthogonally related, parallel line arrays are discussed herein merely as illustrative.

In prior art, a wide variety of gases and gas mixtures have been utilized as the ionizable gaseous medium, it being desirable that the gas provide a copious supply of charges during discharge, by inert to the materials with which it came in contact, and where a visual display is desired, be one which produces a visible light or radiation which stimulates a phosphor. Preferred embodiments of the display panel have utilized at least one rare gas, more preferably at least two, selected from helium, neon, argon, krypton or xenon.

In an open cell Baker et al. type panel, the gas pressure and the electric field are sufficient to laterally confine charges generated on discharge within elemental or discrete dielectric areas confined generally to a region in proximity to the registering projections of opposed electrodes through the dielectric layers and gas. The space between the dielectric surfaces occupied by the gas is such as to permit photons generated on discharge in a selected discrete or elemental volume of gas to pass freely through the gas space and strike surface areas of dielectric remote from the selected discrete volumes, such remote, photon struck dielectric surface areas thereby emitting charges particles so as to condition at least one elemental volume other than the elemental volume in which the photons originated.

With respect to the memory function of a given discharge panel, the allowable distance or spacing between the dielectric surfaces depends inter alia, on the frequency of the alternating potential imposed, the distance typically being greater for lower frequencies.

While the prior art does disclose gaseous discharge devices having externally positioned electrodes for initiating a gaseous discharge, sometimes called "electrodeless discharge", such prior art devices utilized frequencies and spacing or discharge volumes and gas pressures such that although discharges are initiated in the gaseous medium, such discharges are ineffective or not utilized for charge generation and storage at higher frequencies. Although charge storage may be realized at lower frequencies, such charge storage has not been utilized in a display/memory device in the manner of the Bitzer-Slottow or Baker et al. devices.

In operation of the display/memory device an alternating voltage is applied, typically, by applying a first periodic voltage wave form to one array and applying a cooperating second wave form, frequently identical to and shifted on the time axis with respect to the first wave form, to the opposed array to impose a voltage across the cells formed by the opposed arrays of electrodes which is the algebraic sum of the first and second wave forms. The cells have a voltage at which a discharge is initiated. That voltage can be derived from externally applied voltage or a combination of wall charge potential and externally applied voltage. Ordinarily, the entire cell array is excited by an alternating voltage which, by itself, is of insufficient magnitude to ignite gas discharges in any of the elements. When the walls are appropriately charged, as by means of a previous discharge, the voltage applied across the element will be augmented, and a new discharge will be ignited. Electrons and ions again flow to the dielectric walls extinguishing the discharge; however, on the following half cycle their resultant wall charges again augment the applied external voltage and cause a discharge in the opposite direction. The sequence of electrical discharges is sustained by an alternating voltage signal that, by itself, could not initiate that sequence. The half amplitude of this sustaining voltage has been designated $V_s$.

In addition to the sustaining voltage there are manipulating voltages or addressing voltages imposed on the opposed electrodes of a selected cell or cells to alter the state of those cells selectively. One such voltage termed a "writing voltage" transfers a cell or discharge site from the quiescent to the discharging state by virtue of a total applied voltage across the cell sufficient to make it probable that on subsequent sustaining voltage half cycles the cell will be in the "on state". A cell in the on state can be manipulated by an addressing voltage termed an "erase voltage" which transfers it to the "off state" by imposing sufficient voltage to draw off the surface or wall charges on the cell walls and cause them to discharge without being collected on the opposite cell walls so that succeeding sustainer voltage transitions are not augmented sufficiently by wall charges to ignite discharges.

A common method of producing writing voltages is to superimpose voltage pulses on a sustainer wave form in an aiding direction and cumulatively with the sustainer voltage, the combination having a potential of enough magnitude to fire an off state cell into the on state. Erase voltages are produced by superimposing voltage pulses on a sustainer wave form in opposition to the sustainer voltage to develop a potential sufficient to cause a discharge in an on state cell and draw the charges from the dielectric surfaces such that the cell will be in the off state. The wall voltage of a discharged cell is termed an "off state wall voltage" and frequently is midway between the extreme magnitude limits of the sustainer voltage 2 $V_s$.

The stability characteristics and non-linear switching properties of these bistable cells are such that in the case of a cell which has not fired in the preceding half cycle of sustaining voltage the state of any cell in the cell array can be changed by selective application of an external voltage which exceeds the firing or discharge igniting potential. In the case of a cell which has been fired in the preceding half cycle and has accumulated charges which can aid the sustaining voltage, the cell can be turned off by applying a voltage which discharges the cell. These manipulating signals are applied in a timed relationship with the alternating sustaining voltage, and through control of discharge intensity, accomplish selective state transitions by changing the wall voltage of only the cell being addressed.

Cells are transferred to the on state by applying a portion of the manipulating signal superimposed on the sustaining voltage termed a "select signal" on each of two opposed electrodes which constitute the cell. Conventionally, like sustaining signals are imposed on each electrode array so that half the sustaining voltage is imposed on each array and half the select signal is imposed on the addressed cell electrode in each electrode array at a time when the sum of the applied voltages is sufficient to ignite a discharge. Further, the partial select signals on each electrode are limited to a value which will not impose a firing potential across other cells defined by that electrode and not selected. A typical write signal for a cell is developed by applying half select voltages to the addressed electrodes of the cell to be placed in the on state at a time the sustaining voltages are developing a pedestal potential somewhat below the maximum sustaining voltage. Typically, a write signal is imposed on each opposed electrode of the cell during the terminal portion of a sustain voltage half cycle when any wall charging which may result from the prior sustainer transient is substantially completed. The manipulating signal thus ignites a single, and unique, cell at the intersection of the selected two opposed electrodes. This ignited discharge thus establishes the cell in the on state since a quantity of charge is stored in the cell such that on each succeeding half cycle of the sustaining voltage, a gaseous discharge will be produced.

In order to erase a cell or transfer it to the off state the charge stored in the cell is discharged at a time when the sustaining voltage is imposing a voltage in opposition to the wall charge voltage. As for writing, the erase manipulation is facilitated if the sustaining voltage is at a pedestal level below the level providing the maximum applied voltage so that the erase half select voltages are at a convenient level. Typically an erase signal is imposed on each opposed electrode of the cell during the terminal portion of a sustain voltage half cycle, when the wall charging from the prior sustainer discharge is substantially completed, but proceeding the next half cycle alternation by enough time so that the wall discharge of the selected cell is substantially stabilized.

In the operation of a multiple gaseous discharge device, of the above described type, it is necessary to condition or prime the discrete elemental gas volume of each discharge cell by supplying at least one free electron thereto such that a gaseous discharge can be initiated when the cell is addressed with an appropriate voltage signal.

One such means of panel conditioning comprises periodically applying an electronic conditioning signal or write pulse to all of the panel discharge cells. However, electronic conditioning is self-conditioning and is only effective after a discharge cell has been conditioned previously; that is electronic conditioning involves periodically discharging a cell. Accordingly, one cannot wait too long between the periodically applied conditioning pulses since there must be at least one free electron present in order to discharge and condition a cell.

External radiation can be employed to condition a panel, as by flooding part or all of the gaseous medium of the panel with ultraviolet radiation. This is sometimes inconvenient since external radiation may not be available to the panel and at best, required auxiliary equipment.

A frequently employed conditioning termed "internal conditioning" comprises using internal radiation such as from a radioactive material.

Photon conditioning where photons excite electrons as by impingement upon the dielectric surface of the cells is utilized by providing one or more pilot discharge cells maintained in the on state for the generation of photons. This is particularly effective in an open cell construction as disclosed by Baker et al. where the space between the dielectric surfaces occupied by the gas is such as to permit photons generated on discharge in a selected discrete or elemental volume of gas to pass freely through the panel gas space so as to condition other elemental volumes of other discharge units. In addition to or in lieu of the pilot cells, other sources of photons internal to the panel may be used.

Internal photon conditioning may be unreliable when a given discharge unit to be addressed is remote in distance relative to the conditioning source. Accordingly, a multiplicity of pilot cells may be required for the conditioning of a panel having a large area. In one highly convenient arrangement, the panel matrix border is comprised of a plurality of such pilot cells.

Circuitry for sustaining voltages, and where employed their pedestals, and for the manipulating voltages for writing and erasing individual cells can be quite extensive.

Transformer coupling of manipulating signals to the electrodes of multiple gas discharge display/memory devices has been disclosed in William E. Johnson et al. U.S. Pat. No. 3,618,071 for "Interfacing Circuitry and Method for Multiple - Discharge Gaseous Display and/or Memory Panels" which issued Nov. 2, 1971. The coupling of individual electrodes in large arrays involving substantial numbers of electrodes is cumbersome and expensive. Accordingly, solid-state pulser circuits capable of feeding through the sustaining voltage were proposed as exemplified in William E. Johnson U.S. Pat. No. 3,611,296 of Oct. 5, 1971 for "Driving Circuitry For Gas Discharge Panel". Multiplexing of the signals to the electrodes in an array has been utilized employing combinations of diode and resistor pulsors to manipulate cell potentials as shown in U.S. Pat. No. 3,684,918 issued Aug. 15, 1972 to Larry J. Schmersal for "Gas Discharge Display/Memory Panels and Selection and Addressing Circuits Therefore".

An object of the present invention is to facilitate the control of multiple gas discharge display/memory device for electronic conditioning of the devices and the manipulation of cell states.

Another object of the invention is to reduce the power requirements for circuits employed to manipulate cell states in a multiple gas discharge display/memory device.

A third object is to reduce the voltage requirements for addressing components for multiple gas discharge display/memory devices.

A fourth object is to eliminate resistors and their incident power dissipation from addressing circuits for multiple gas discharge display/memory devices.

A further object is to simplify the sustainer and addressing circuitry for multiple gas discharge display/memory devices.

Another object is to separate the sustainer and address functions of the circuits for multiple gas discharge display/memory devices.

Another object is to reduce interaction between proximate conductors of the panel arrays, particularly such interactions attributable to interconductor capacitance.

SUMMARY OF THE INVENTION

In accordance with the above objects one feature of the invention resides in circuitry for generating dissimilar, periodic, pulsating sustainer voltage component wave forms for opposed electrode arrays of the panel to in sum impose an alternating sustainer voltage across the panel cells. The components when developed with respect to a reference voltage, for example ground or a slight voltage offset from ground, can include a relatively small amplitude wave form made-up of excursions in one direction from the reference voltage and a relatively large amplitude wave form made up of excursions in one direction from the reference voltage, with the excursion opposite that of the small amplitude wave form at least equal to that small amplitude. The circuits for manipulating the discharge states of the cells of the panel are arranged to impose pulses to the reference voltage level to the electrodes whose opposed areas constitute the cells to be manipulated at the time the components are at opposite excursions.

Another feature of the invention involves electronically inverting the cells of the panel by shifting to a large amplitude wave form on the electrode array which currently has the small amplitude wave form and shifting a small amplitude wave form to the electrode array which currently has the large amplitude wave form. While the sum of the sustaining voltage components applied during an operating period must be the sustaining voltage of the cell, and while the aforementioned large and small amplitude wave forms can be different, it is advantageous to employ the same large and small wave forms on each electrode array. This permits symmetrical circuitry on each array. One form of sustainer component control includes a pull-up and pull-down buss diode coupled to each of a plurality of display lines to electrodes of the respective array. Signal generators are connected to those busses as normally open switches connected to direct current voltage sources. The switches are conveniently transistors such that a single pull-up circuit is employed for the pull-up buss of each array and for the positive voltage excursion for both the large and small wave forms for each array. Two pull-down circuits are coupled to each pull-down buss, one to the maximum negative excursion and the other to the reference potential.

A third feature of the invention is an arrangement of symmetrical circuits coupled to opposed electrode arrays of a multicelled gaseous discharge display/memory device to impose interchangeable, different, sustainer component wave forms on the opposed arrays.

Another feature of the invention is a circuit arrangement which separates the sustainer voltage generation and application from the individual cell address voltage generation and application for a multicelled gaseous discharge display/memory device.

A further feature of the invention is a circuit which reduces the power requirements on the addressing components by enabling the sustainer source to be momentarily driven to the partial select levels prior to the application of addressing signals to the addressed cells all without loss of the desired voltage levels on those cell electrodes which are not addressed. A particularly advantageous partial select signal level is external ground which, when utilized for erase control of cells, involves transitions less than the normal sustaining voltage yet offers the reliability of response heretofore realized only with ground-based addressing. Switches and diodes are employed in the addressing circuits without requiring resistors with the losses incident to their use, even when addressing is driven directly from ground-based logic.

Another feature is the use of a single address pulser to apply manipulating signals to a display connector line for each of the electrode arrays. That is, write and erase pulsers are shared by the electrode arrays. All manipulation of cells is by pull-to-reference voltage signals of short duration relative to the sustainer voltage cycle. Cell erasure is accomplished while its electrodes are subjected to sustainer component voltages of opposite polarity and is utilized to place a cell effectively in the off state of discharge by an erasure during operation in the normal resultant sustainer mode, e.g. with a first array having the small component and the second array the large component for a preponderant portion of the time. The writing of a cell is accomplished by an electronic inversion of the discharge states of all cells from their states for operation in the normal mode, then an erasure of the cell to be written, followed by an electronic reinversion of all cells so that the cell erased while inverted is in the on state of discharge during the normal mode of operation. Where electronic inversion is by means of an interchange of the large and small sustainer components, the address pulsers function for both a normal erase and inversion-erase writing function. That is a positive going address pulser can pull-up that display line and its electrode or electrodes at the sustainer level below reference voltage in either array by virtue of its coupling to both arrays with diodes poled to pass current from the pulser to the two display lines. This is done without effect on the display line of the other array since, at that moment that other line is at a voltage above reference voltage by virtue of its applied sustainer component and its diode blocks the signal. Conversely the negative going address pulse will pull-down the display line then subject to a voltage below the reference voltage without effect on its counterpart display line in the other array coupled to its pulser since diodes couple the pulser to each of these display lines and are poled to pass current from the lines to the pulser and will be back biased for the other line.

Other dual function circuits are selectively effective according to the effective sustainer component including diode clamps and selective switches to accommodate displacement currents in the panel, pre-address pulsers for discharging buss capacitances and automatic border conditioning controls. In each of these circuits the effective operation to the voltage from either buss or electrode array affords this advantage. Thus, with regard to the accommodation of displacement currents such displacements are on the buss of one array for the normal operating mode of the sustainer components and on the buss of the other array for the inversion operating mode and, since each sustainer component shifts to the same voltage level, a diode coupling from the two pull-up or pull-down busses to appropriate common sources of bias can be employed as the low voltage excursion bias level on the pull-up busses and the high voltage excursion level on the pull-down busses with the diodes connected to be back biased by those bias levels. Where a displacement current is developed due to a shift in a component to the reference voltage level, the back biased diodes can be selectively effective by clocking a switch from a reference voltage bias source to the diodes poled to pass current to the pull-up busses.

Pre-address pulsers pulse the busses to the reference voltage, a negative going pulse being clocked to the pull-up busses subsequent to the termination of the sustainer component application to the relatively high pull-up buss and prior to the address of the negative going address pulser for the selected display connector line. Conversely, a positive going pre-address pulser is clocked to the pull-down busses subsequent to the termination of the sustainer component application to the relatively low pull-down buss and prior to the address of the positive going address pulser for the selected display connector line. These pre-address pulsers are each coupled to the busses for both electrode arrays of the panel with the negative going pulses coupled to the pull-up busses through diodes poled to pass current from the busses to the pulser and the positive going pulser coupled to the pull-down busses through diodes poled to pass current from the pulser to the busses.

Another feature of these circuits is means for compensating for inter-electrode capacitance and the attendant tendency for an electrode pulled to the reference voltage by an address pulser to pull its adjacent electrodes in the same direction to a degree which can cause marginal or false operation of cells which are not addressed. Passive compensation circuits are shown comprising capacitances connected from a voltage source at a convenient level to each display connector line for one array whereby the sustainer component on that array charges and discharges the capacitor so that the charge level at the moment of address of a display connector line counteracts any tendency of proximate display connector lines to alter their voltage. Alternatively, active compensation circuits are shown employing a common pulser of the positive going and negative going type coupled through limiting resistances to all display connector lines so that the appropriate pulser is actuated with the addressing pulser to augment or hold the voltage levels on the connector lines for electrodes proximate and within the range of capacitive influence of the addressed electrode.

DESCRIPTION OF THE PREFERRED EMBODIMENT

Figure 1:
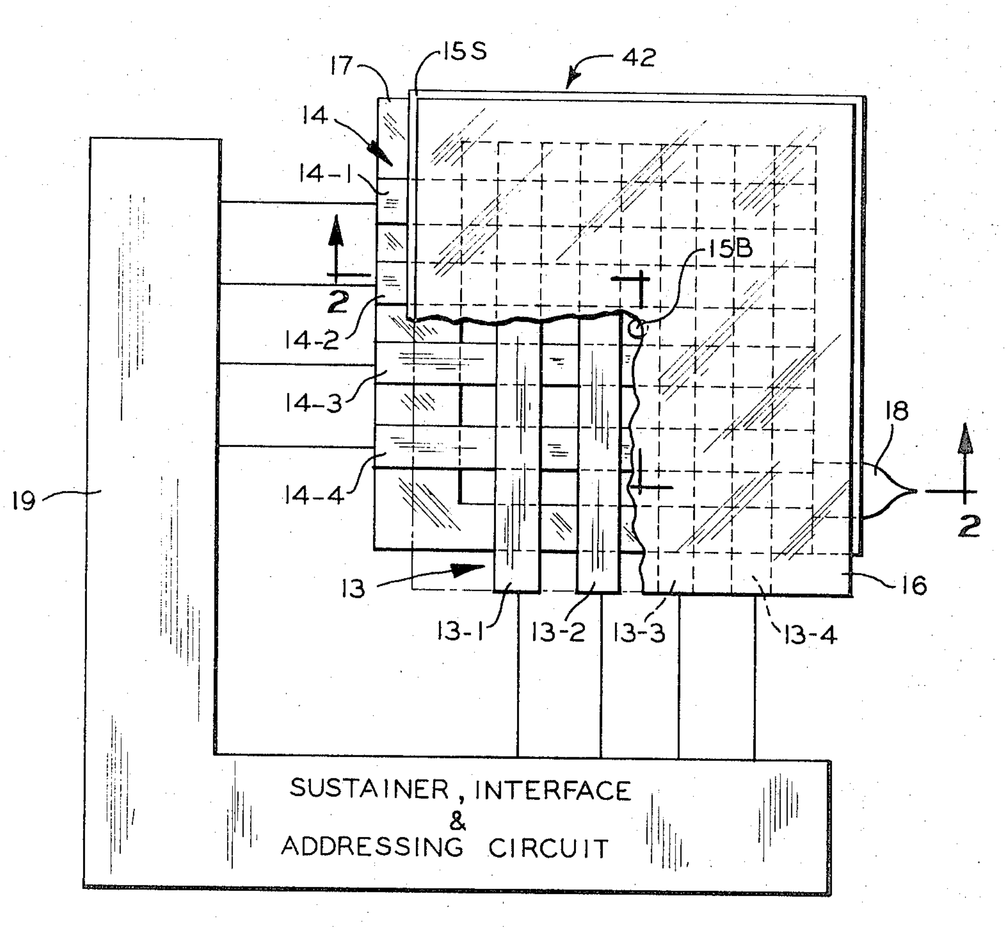
FIG. 1 is a partially cut-away plan view of a gaseous discharge display/memory panel as connected to diagrammatically illustrated sources of operating potentials.
Figure 2:
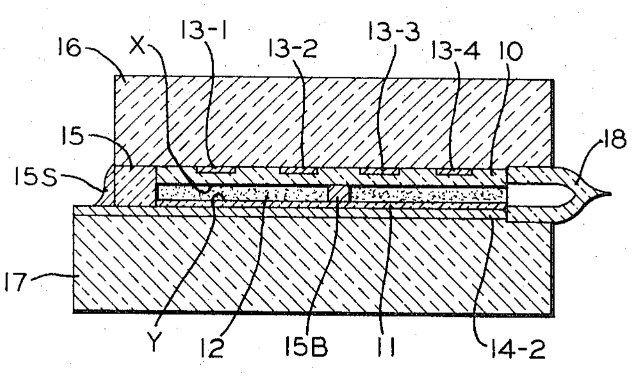
FIG. 2 is a cross-sectional view (enlarged but not to proportional scale since the thickness of the gas volume, dielectric members and conductor arrays have been enlarged for purposes of illustration) taken on lines 2—2 of FIG. 1.

One form of multicelled gas discharge display/memory device to which the invention is applicable as illustrated in FIG. 1, utilizes a pair of dielectric films 10 and 11 separated by a thin layer or volume of a gaseous discharge medium 12, the medium producing a copious supply of charges (ions and electrons) which are alternately collectable on the surface of the dielectric members at opposed or facing elemental or discrete areas, X and Y, defined by the conductor array on non-gas contacting sides of the dielectric members, each dielectric member presenting large open surface areas and a plurality of pairs of elemental X and Y areas. While the electrically operative structural members such as the dielectric members 10 and 11 and conductor arrays 13 and 14 are all relatively thin (being exaggerated in thickness in the drawings), they are formed on and supported by rigid non-conductive support members 16 and 17 respectively.

One or both of non-conductive support members 16 and 17 pass light produced by discharges in the elemental gas volumes unless only the memory function is utilized, in which case they can be opaque. Advantageously, they are transparent glass. Members 16 and 17 essentially define the over-all thickness and strength of the panel. They serve as heat sinks for heat generated by discharges and thus minimize the effect of temperature on operation of the device. For example, the gas layer 12 is usually under 10 mils and typically about 4 to 6 mils in thickness as determined by spacer 15. Dielectric layers 10 and 11 (over the conductors at the elemental or discrete X and Y areas) are usually between 1 and 2 mils thick. Conductors 13 and 14 are about 8,000 angstroms thick and may be of transparent, semi-transparent or opaque conductive material such as tin oxide, gold or aluminum.

Spacer 15 may be made of the same glass material as dielectric films 10 and 11 and may be an integral rib formed on one of the dielectric members and fused to the other member to form a bakeable hermetic seal enclosing and confining ionizable gas volume 12. A separate final hermetic seal may be effected by a high strength devitrified glass sealant 15S. Tubulation 18 is provided for exhausting the space between dielectric members 10 and 11 and for filling that space with the ionizable gas. For large panels, small beadlike solder glass spacers 15B may be located between conductor intersections and fused to dielectric members 10 and 11 to aid in withstanding stress on the panel and maintain uniformity of thickness of gas volume 12.

Conductor arrays 13 and 14 may be formed in situ on support members 16 and 17, typically as parallel lines of about 3 mils width spaced 17 mils center to center and having a resistance less than about 1,000 ohms per linear inch of conductor line and usually less than 50 ohms per inch.

Dielectric layer members 10 and 11 are formed of an inorganic material and are preferably formed in situ as an adherent film or coating which is not chemically or physically affected during bake-out of the panel. One such material is a solder glass such as Kimble SG-68 manufactured by and commercially available from the assignee of the present invention. This glass has thermal expansion characteristics substantially matching the thermal expansion of certain soda-lime glasses suitable, when in plate form, for support members 16 and 17. Dielectric layers 10 and 11 must be smooth and have a dielectric strength of about 1,000 volts per mil and be electrically homogenous on a microscopic scale (i.e. no cranks, bubbles, crystals, dirt, surface films or other irregularities). Also, the surface of dielectric layers 10 and 11 should be good photo-emitters of electrons. Alternatively, dielectric layers 10 and 11 may be overcoated with materials designed to produce good electron emission, and in U.S. Pat. No. 3,634,719, issued to Roger E. Ernsthausen. Where an optical display is desired, at least one of the dielectric layers and any overcoats therefor should pass light.

The ends of conductors 14–1 . . . 14–4 and support member 17 extend beyond the enclosed gas volume 12 and are exposed for the purpose of making electrical connection to external circuitry generically termed the "sustainer, interface and addressing circuitry" 19. Likewise, the ends of conductors 13–1 . . . 13–4 on support member 16 extend beyond the enclosed gas volume 12 and are exposed for the purpose of making electrical connection to sustainer, interface and addressing circuitry 19.

Figure 3:
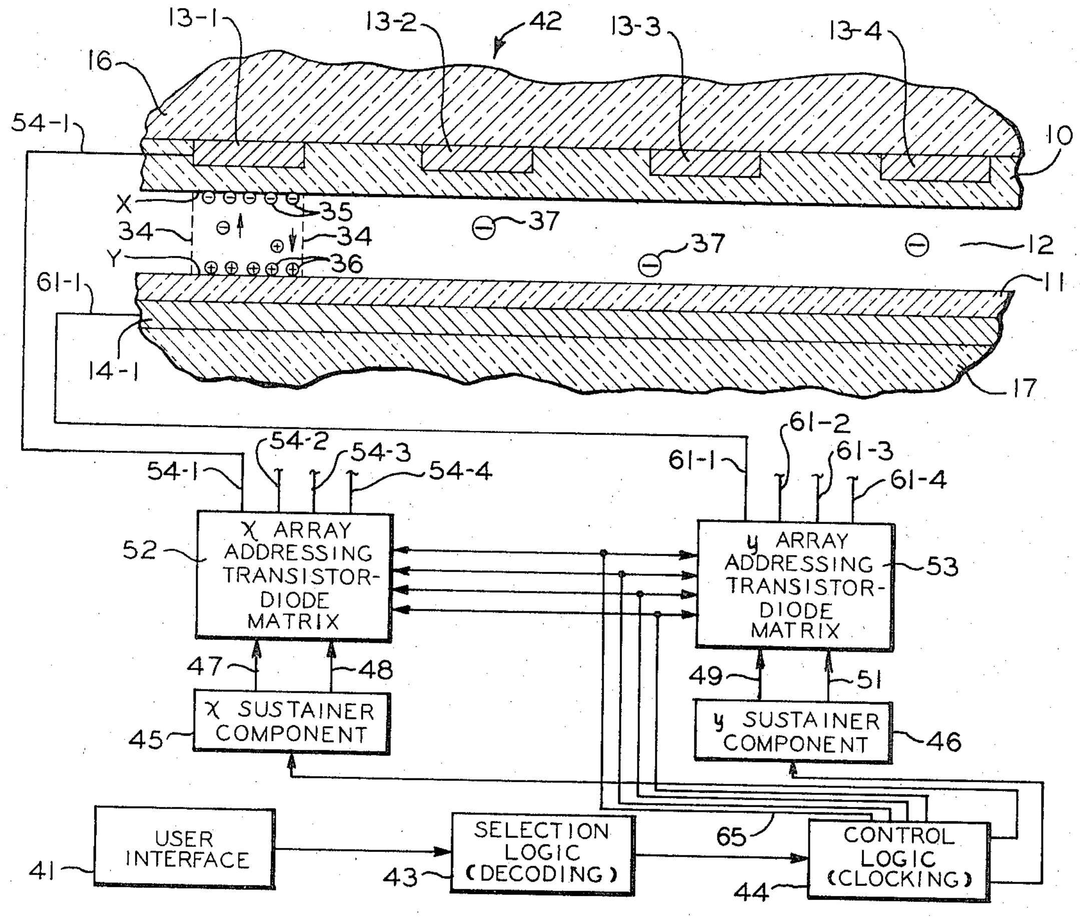
FIG. 3 is an explanatory partial cross-sectional view similar to FIG. 2 (enlarged, but not to proportional scale) with blocked diagrammed sustainer component and addressing circuits.
Figure 4:
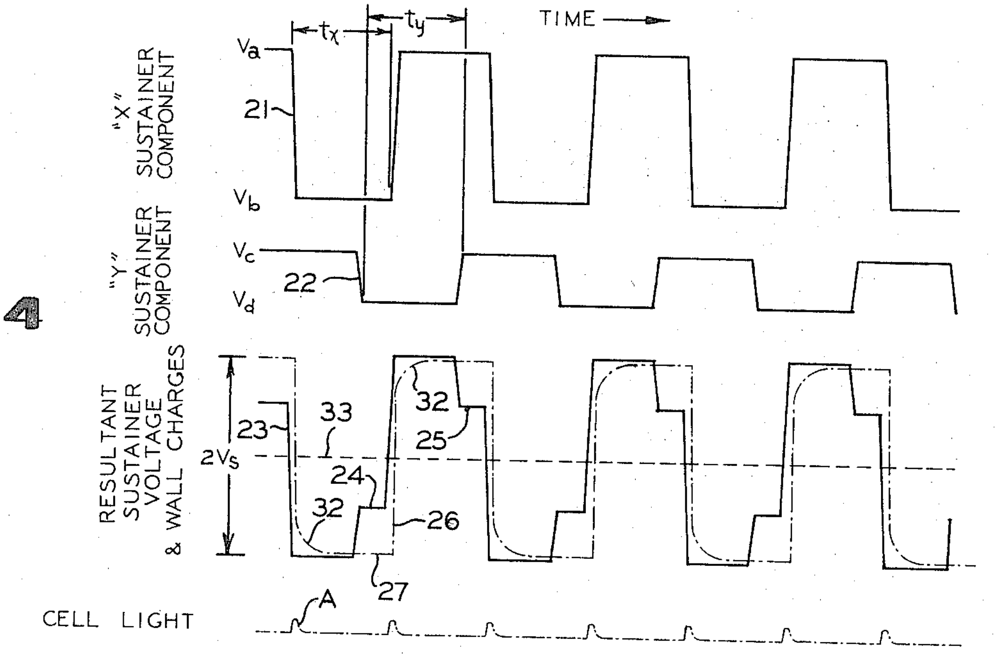
FIG. 4 is a generalized sustaining voltage wave form applied across a panel, typical cell wall voltages for such a wave form, and the component wave forms making up the resultant sustainer wave form, all plotted against time, illustrating a means of off-setting the neutral cell wall voltage from external ground.
Figure 5:
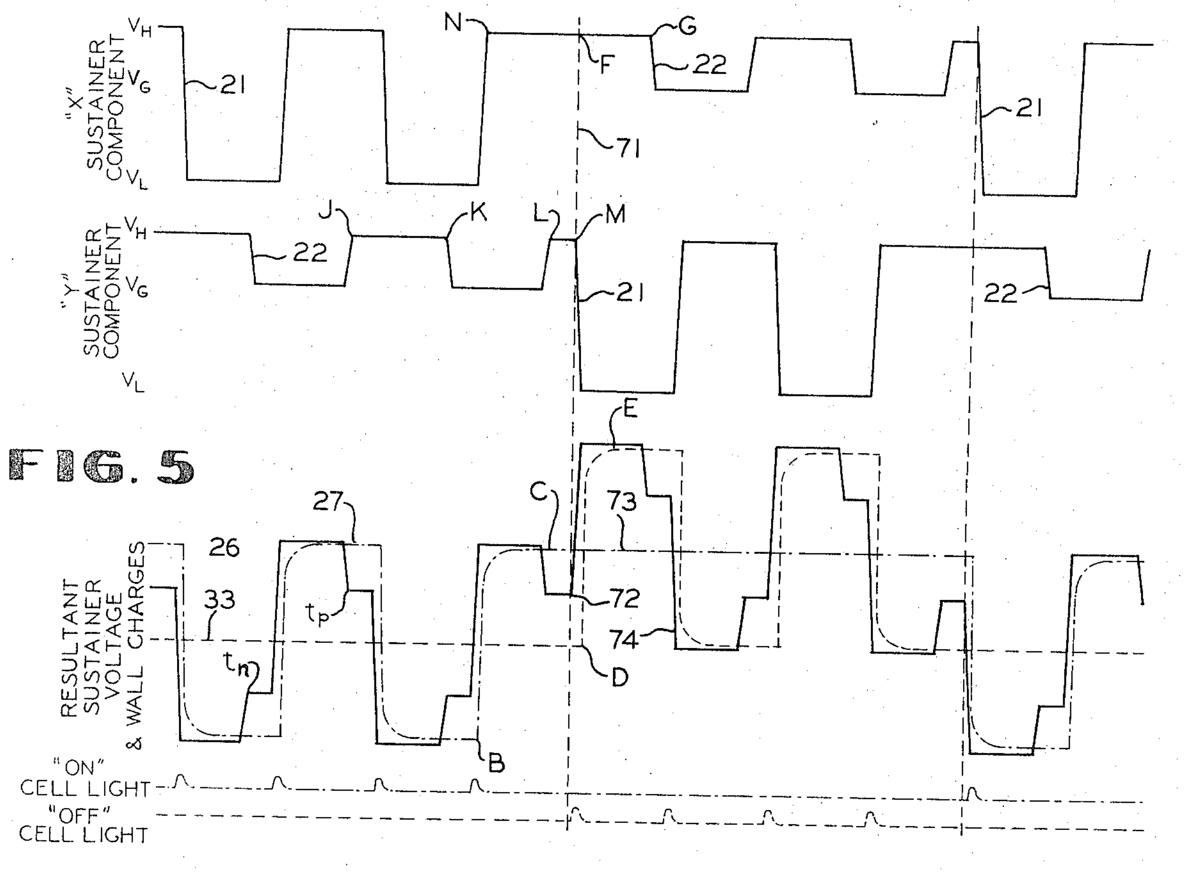
FIG. 5 is a generalized sustaining voltage wave form, typical cell wall voltages for such a wave form, the component wave forms making up the resultant sustainer wave form, and light emitted for discharging cells, all plotted against time, and illustrating the electronic inversion of the panel by an interchange of wave form components between the opposed electrode arrays.
Figure 6:
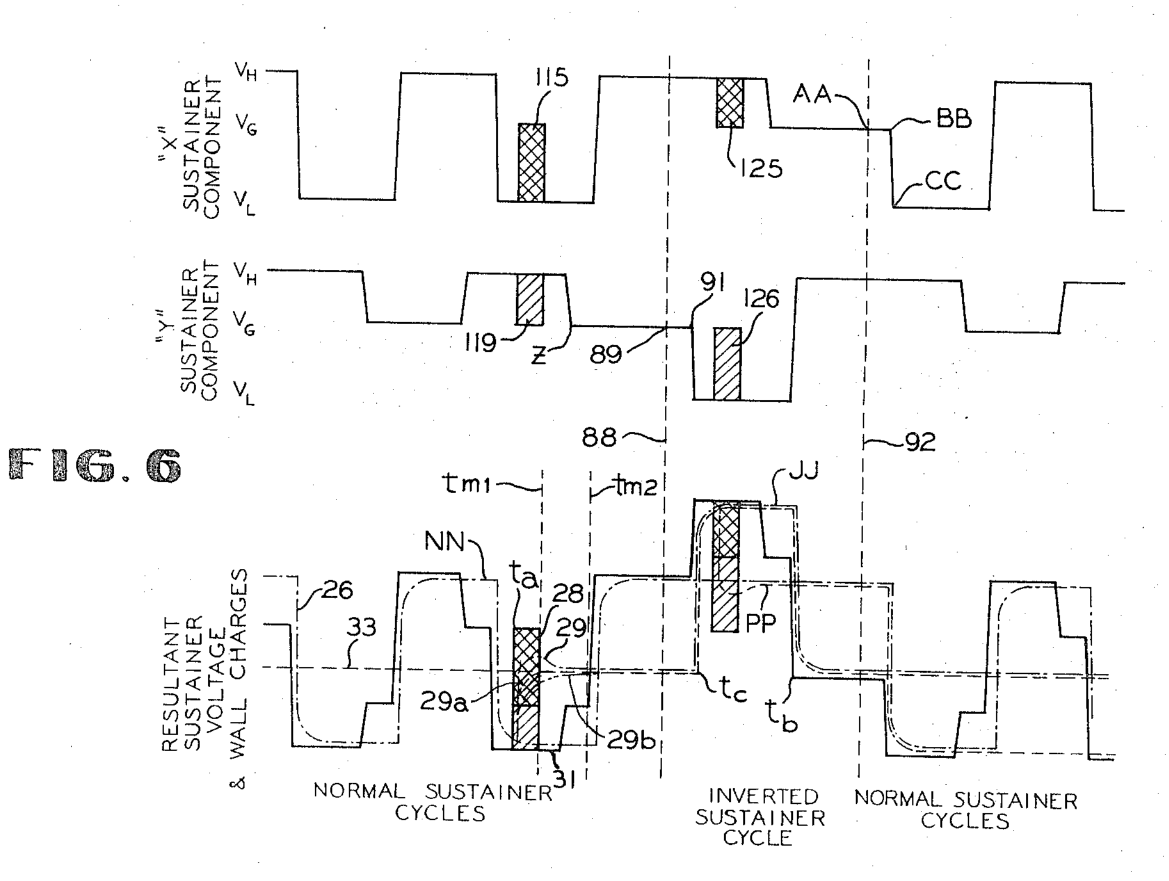
FIG. 6 is a plot against time of wave forms of the general type shown in FIG. 5 and with addressing voltages superimposed to illustrate cell write and erase techniques by means of appropriate shifts of the resultant sustainer wave form and partial select signals applied to individual electrodes of the addressed cell.

A schematic representation of the device and block diagram of the signal source interface, representative sustainer voltage component sources and addressing voltage sources, more generally represented as sustainer, interface and addressing circuit 19 in FIG. 1, are shown in FIG. 3 as a means of producing the wave forms of FIGS. 4, 5 and 6. Prior art sustainer voltage components have been applied to opposed electrode arrays of display/memory device panels referenced from ground, each usually with one-half the total amplitude of the sustainer voltage across the panels. The present sustainer voltage components are assymetric with a greater amplitude on one electrode array then on the other for one operating mode and a lesser amplitude on the one electrode array than on the other for another operating mode.

Prior art has addressed individual cells of a panel for manipulation with symmetrical partial select signals imposed on the opposed electrodes, frequently from pedestals adjusted in height so that the select signals are of equal magnitude for write and erase functions. These symmetrical partial select signals have been termed "half select signals" since half the total signal is imposed on each array. The present invention employs partial select signals which are assymetric, advantageously with amplitudes from their current sustainer component levels to a reference value illustrated as external ground or external ground with a slight offset. Where the assymetrical sustainer voltage components are shifted between panel operating modes by an interchange of components and erase pulses are employed for both write and erase functions by correlating them with the panel operating mode, like circuits can be employed for the opposed electrode arrays. For convenience the construction illustrated will have electrodes orthogonally related and will identify one array as the $x$ coordinate and the other as the $y$ coordinate.

Signal developing desired displays by the arrangement or relative position of cells in the on state in a field of off state cells or cells in the off state in a field of on state cells are derived from a user interface 41 which is supplied from a source (not shown) such as a computer, a typewriter, or any well known source of signals ameniable to display or storage functions. Signals from the interface 41 are encoded with respect to the cells of the display panel 42 which are to be selected for the display or storage function by selection logic 43. With the cells thus identified, their state is altered, if necessary, for the desired function by control logic 44. In the case of erase of a cell in the on state the control logic imposes ground partial signals at an appropriate time in a normal sustainer cycle to the opposed electrodes of the $x$ and $y$ arrays which constitute the cell. A write of a cell, its transfer to the on state for normal cycles, is accomplished by the control logic by electronically inverting the panel, and while in the inverted mode, erasing the selected cell by imposing ground partial select signals at an appropriate time in an inverted sustainer cycle to the opposed electrodes of the $x$ and $y$ arrays which constitute the cell. Thus the control logic includes the clocking functions for the sustainer alternations for each sustainer component, the appropriate timing of the interchange of the component wave forms for electronic conditioning by panel inversion, if such is employed, and for the electronic inversion for erase-writing, and the timing of the partial select signals to coordinate properly with the normal or inverted sustainer components in the erase and writing functions. Decoding logic and addressing logic while complex is conventional in that it coordinates the application of addressing pulses for the display connector lines supplying the array electrodes of the cells to be written or erased at proper moments in either the normal sustainer mode or the abnormal sustainer mode as required. Further, in accordance with the general operating parameters of device of the type under consideration the addressing pulses are of a relatively short duration as compared to the sustainer cycles in order that they are imposed initially when cell wall change conditions have stabilized from the preceding sustainer transient and are terminated in time to permit stabilization of the manipulated wall charge prior to the next following sustainer transient.

A sustainer generating circuit 45 and 46 subject to control signals from control logic 44 is represented for the $x$ and $y$ arrays respectively. Each such circuit includes a pull-up buss and pull-down buss as 47 and 48 for the $x$ component and 49 and 51 for the $y$ component. Sustainer component signals are imposed on the individual electrodes of the arrays through isolation diodes which are arranged in matrices with transistor switches to isolate the addressing pulses from the electrodes at voltage levels which back bias them and upon which they are not effective while they impose partial select signals on those electordes at the voltage levels. Addressing transistor-diode matrices 52 and 53 are thus the medium by which both the sustainer component voltages and the partial select signals are passed to the display connector lines 54–1 through 54–4 and 61–1 through 61–4, as examples, to electrodes 13–1 . . . 13–4 and 14–1 . . . 14–4, for example. Control logic input signals to the addressing transistor switches are illustrated for four cells for individual cell control as by lead 65 which might control a partial select signal to electrode lead 54–1 of the $x$ array and electrode lead 61–1 of the $y$ thereby controlling cell 13–1 – 14–1 as illustrated Prior art sustainer voltages have been generated by developing a periodic voltage with a predetermined time relationship on each of the opposed arrays of a multicelled gaseous discharge display/memory panel. Each sustainer voltage component has been of the same magnitude such that a convention has developed wherein the symbol $V_s$ has been applied to the voltage magnitude which is half the total applied across the cells by the resultant sustainer wave form and that total has been designated $2V_s$. In considering wave forms having essentially a square wave form it is to be appreciated that as in prior devices the shape of component wave forms is not critical to device operation and the square wave is chosen for convenience in illustration. Further, it should be recognized that the square wave representation is an approximation only in that a finite rise time and decay time is required for signal transitions.

The present resultant sustainer wave forms applied across the cells are developed from components which are not identical in magnitude. This gives rise to an off state wall voltage for cells which are not conditioned to discharge each half cycle which is displaced from the usual external ground level. As illustrated, the component wave forms are square and are at their extreme levels for essentially a full half cycle although such intervals for extremes are not critical to operation according to the invention. The component wave forms 21 and 22 have like periods which are offset along the time axis in a non-critical manner. It should be understood that the offset of component wave forms can range from synchronism to a 180° phase difference although at synchronism, the components tend to cancel in the resultant sustainer wave form 23. In the illustrated wave forms the component sustainer wave forms are about 135° out of phase to produce a pedestal 24 and 25 as will be discussed.

Wall charge plots 26 have transitions which are offset along the time axis from the applied sustainer voltage since the wall charge transitions are not initiated until a critical voltage transition has occurred. Transfer characteristics for the cells (not shown) are available to indicate the voltage level required for a given charge displacement. Generally, the magnitude of the sustainer voltage 23 is sufficient to develop a wall charge 26 which almost totally neutralizes the applied sustainer and thus closely approaches the sustainer magnitude for such transitions as at 27. The lower magnitude erase signals 28 discharge the cell walls to a level intermediate the sustainer amplitudes as will be shown in FIG. 6, possibly with a slight overshoot of the neutral axis as at 29 which decays toward the neutral level in the reverse field at 31 often present following the erase signal pulse. Each of the wall charge transitions involves a build-up interval represented by the knees 32 in the curves 26. Thus where wall charge transitions take place, some interval of time is required for the charge level to stabilize. For example, where the operating frequency of the sustainer is fifty kilohertz (50Kh), and $t_x$ and $t_y$ of the example are 10 microseconds (half a 20 microsecond period) a typical wall charge stabilization requires about 7 microseconds. As will be explained, these stabilization intervals impose some limitations on the time relationships of the sustainer and wall charge transitions which can be employed in manipulating the panel.

A sustainer voltage need not be referenced from ground. That is, the sustainer voltage component applied to the $x$ coordinate array of electrodes 13 need not switch between ground and some chosen voltage, but rather, can be switched between any two voltages. As shown in FIG. 4, a sustainer voltage component for the $x$ coordinate is switched between a value $V_a$ and $V_b$ while the $y$ coordinate sustainer voltage component is switched between $V_c$ and $V_d$ to produce a resultant sustainer voltage $2V_s = (V_a - V_b) + (V_c - V_d)$. The resultant wave form across the panel is generalized for the case where the two alternating components 21 and 22 have the same period with equal half cycle periods and voltage transitions which may be offset in time and the center of the band of "off" cell wall voltage 33 lies midway between the sustainer voltage amplitude extremes. This relationship provides the greatest sustainer range.

In FIG. 5 the sustainer circuitry ground external of the display panel is shown placed between $V_a$ and $V_b$ of FIG. 4 for one component of the sustainer voltage, normally the $x$ component 21, so that one value is positive and the other negative, designated as $V_H$ and $V_L$. The other component of the sustainer voltage, normally the $y$ component 22, is shown referenced to ground in the external circuitry such that $V_d$ is ground and $V_c$ is $V_H$. It should be recognized that there are no restrictions on the sustainer component voltages in that while $V_H$, the smaller excursion from the reference voltage, ground $V_G$, is positive it could be negative and the lower voltage, and while $V_L$, the larger excursion from the reference voltage, is negative it could be positive and the higher voltage. Further, while the most convenient writing manipulation of cells is by a grounded erase partial select with inversion and inversion conditioning is by means of voltage interchanges with $V_H$ as the small excursion for the large amplitude wave for and the magnitude of the small amplitude wave form, this is not necessary, and different values can be employed for the two wave forms and for the small and large amplitude wave forms on the two arrays. The detailed discussion of wave forms which follows is for the special case of interchange of the same or essentially the same wave form between arrays and for excursions limited to $V_H$ and $V_L$. As will be explained for the present operation, the theoretical maximum limit is $V_H/V_L$ equal to one, a typical practical value is $V_H/V_L$ equal to two thirds, a preferred practical value is $V_H/V_L$ equal to one-half and the minimum practical value is determined by the transfer characteristics of the panel employed particularly that excursion of the resultant sustainer voltage from the off state cell wall value during the interchange of sustainer components on the electrode array which is tolerable without an involuntary writing of cells in the off state.

Consider the condition where $V_H$ is one-half $V_L$ in absolute magnitude. Under these circumstances the sustainer voltage component 21 normally applied to the $x$ coordinate array 13 can be interchanged with the sustainer voltage component 22 normally applied to the $y$ coordinate array 14 and, if the values are chosen to produce an effective sustainer voltage with the algebraic sum of the components, the cell states in the panel can be inverted in response to the interchange. That is every "on" cell is transferred to an off state and every off cell is transferred to an on state.

These inversions rely upon the known phenomena in a multicell display/memory gas discharge device as will be appreciated from a consideration of FIGS. 3, 4 and 5. The general region of registry of an electrode 13–1 in the electrode array 13 for the $x$ coordinate and an electrode 14–1 in the electrode array 14 for the $y$ coordinate comprises a discharge site or cell in the ionizable gas defined by the boundries represented by the dashed lines 34. Dielectric surfaces X and Y for the on cell 13–1 - 14–1 are shown while the cell 13 -2 - 14–1 is shown in the off state. It will be noted that the drawing represents the state where the $x$ coordinate, array 13, is at a relatively positive voltage with respect to the $y$ coordinate array 14 such that the on state cell has negative charges 35, electrons, collected on its dielectric surface X while the surface $y$ has positive charges 36, ionized atoms, collected on its surface. The charges are termed "well charges" and produce the augmenting voltage which on the next alternation of the sustaining voltage impose a total voltage across the cell sufficient to ignite ionization in the reverse direction.

Adjacent cells in the off state have an essentially neutral wall charge although random photon generated electrons 37 are represented in their vicinity for priming or conditioning purposes.

The composite generalized wall charge for a cell initially in the on state is shown in the dot-dashed lines 26 of FIG. 4, and the dashed line 33 represents the wall charge of a cell initially in the off state. In FIG. 4 the half periods of the components are equal ($t_x = t_y$) and each is half a sustainer cycle although they may be unequal. It will be noted that with symmetrical half periods of the composite sustainer voltage of FIG. 4, the off state cell wall charge voltage 33 is midway between the extremes of amplitude. The on state cell wall charge voltage is characterized by a wave form which builds from an offset along the time axis, the growth occurring with the accumulation of charge from ignition of ionization until neutralization of the sustainer voltage.

As further shown in the plot of cell light vs. time in FIG. 4 at A, the on cell emits a burst of light having an interval of the order of five hundred nanoseconds. While the onset of light coincides with the discharge, the duration of the light bursts is not shown to scale along the time axes in the curves. They occur when the rising voltage of the opposite polarity to that which created the wall charge voltages, added to the wall charge voltages, exceeds the turn on voltage of the discharge site within the limits 34. They terminate when the accumulation of neutralizing charge builds up a wall charge voltage which reduces the total effective voltage across the gas below that at which an ionization discharge will be maintained.

FIG. 5 shows the wall voltages for the assumed special case where the components of the sustainer voltage applied to the *x* and *y* coordinates are different magnitudes and are interchanged. This form of wave shifts the average neutral of the resultant sustainer voltage and thus the effective axis of the wall voltage with an interchange of sustainer voltage components and, when appropriately timed with respect to the wave forms, will impose a write signal on the cells in the off state, and leave the wall charge of the cells in the on state at the new average neutral so that they no longer are discharged by the succeeding half cycle transients of the composite sustainer voltage.

Transition of a cell from the on state to the off state by a sustainer voltage component interchange at time 71 shifts the resultant sustainer voltage as at 72 so that its new off state cell wall voltage 73 approaches, or in the assumed case in the same value as, the wall voltage 27 of the previously discharging cells so that subsequent resultant sustainer voltage transitions 74 have no augmenting wall voltage at those cells to raise their voltage to a level required to ignite a discharge. This is illustrated by the on cell discharge B–C and level C of FIG. 5. Conversely with respect to the cells in an off state the displacement of the resultant sustainer voltage with respect to their previously acquired off state wall voltage, upon interchange of the sustainer components, is toward the wall voltage of an on-state cell. In the assumed case it is at the voltage of an on state cell. That is the wall voltage effectively is of a magnitude and polarity of D of FIG. 5, to aid the transition of the sustainer voltage at this time so that a discharge igniting voltage is imposed across those cells. As a result, the charged particles accumulate on the dielectric surfaces of the cell walls as they neutralize that voltage and decay in their photon emission. This charge accumulation represented by the well voltage level at E of FIG. 5 re-enforces the subsequent cycle of the interchanged wave form to maintain the on state for those cells until they are manipulated to be discharged to an off state level.

Figure 7:
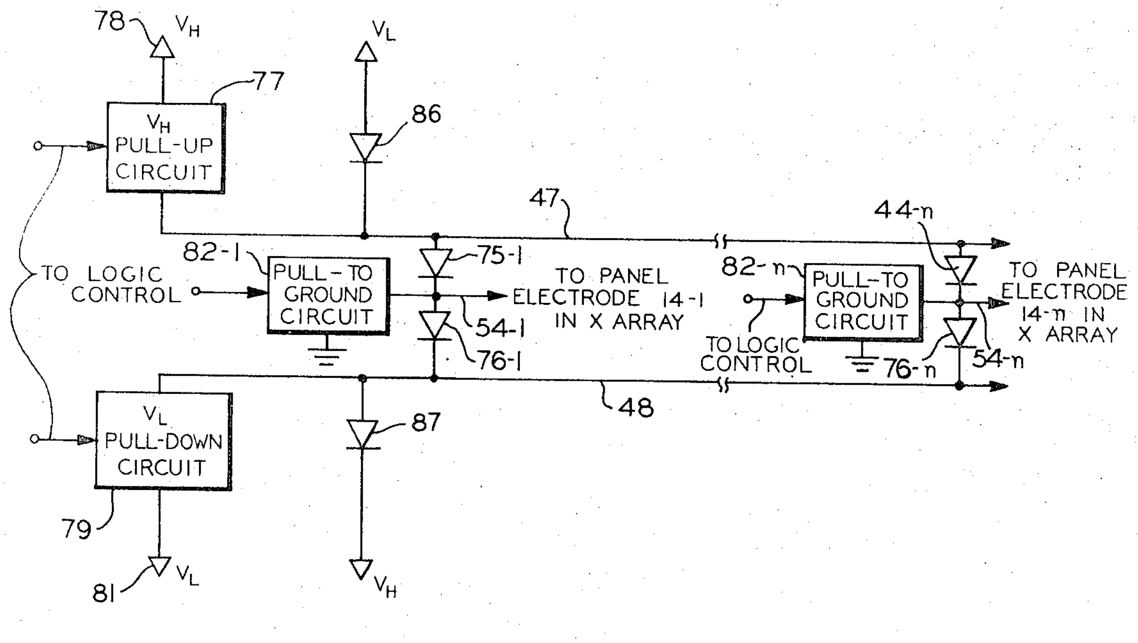
FIG. 7 is a block diagram of a circuit for applying sustainer component wave forms to an electrode array and addressing circuits for typical electrodes within the array for selectively applying partial select signals to those electrodes.
Figure 8:
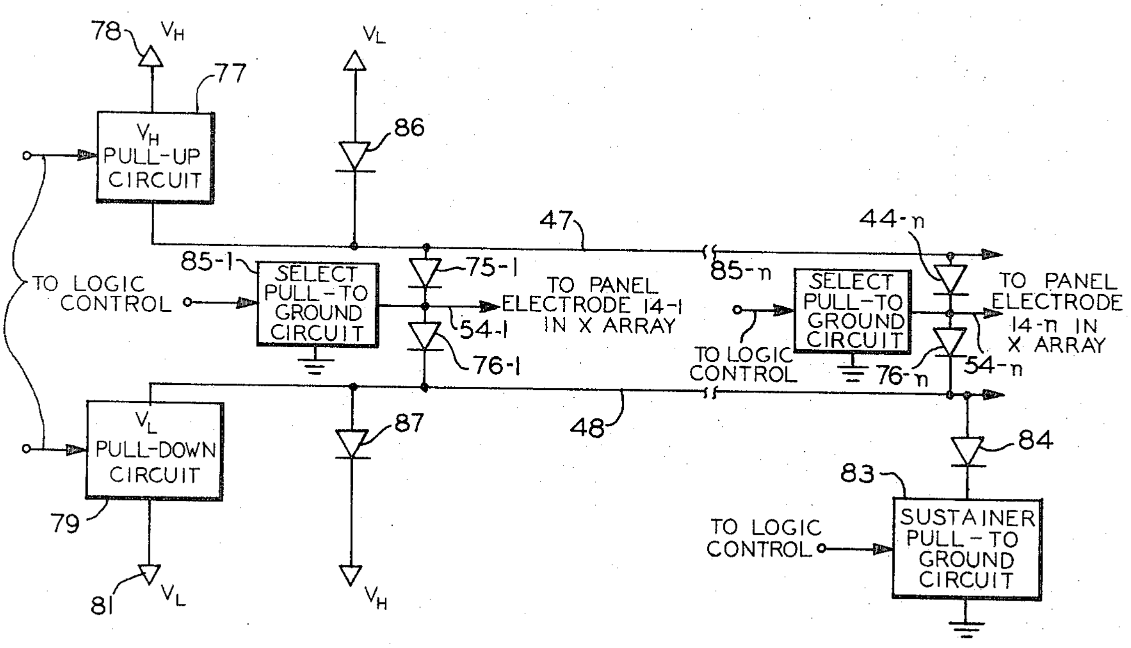
FIG. 8 is a block diagram of a circuit similar to FIG. 7 with the added feature of sustainer pull-to-ground circuit.
Figure 9:
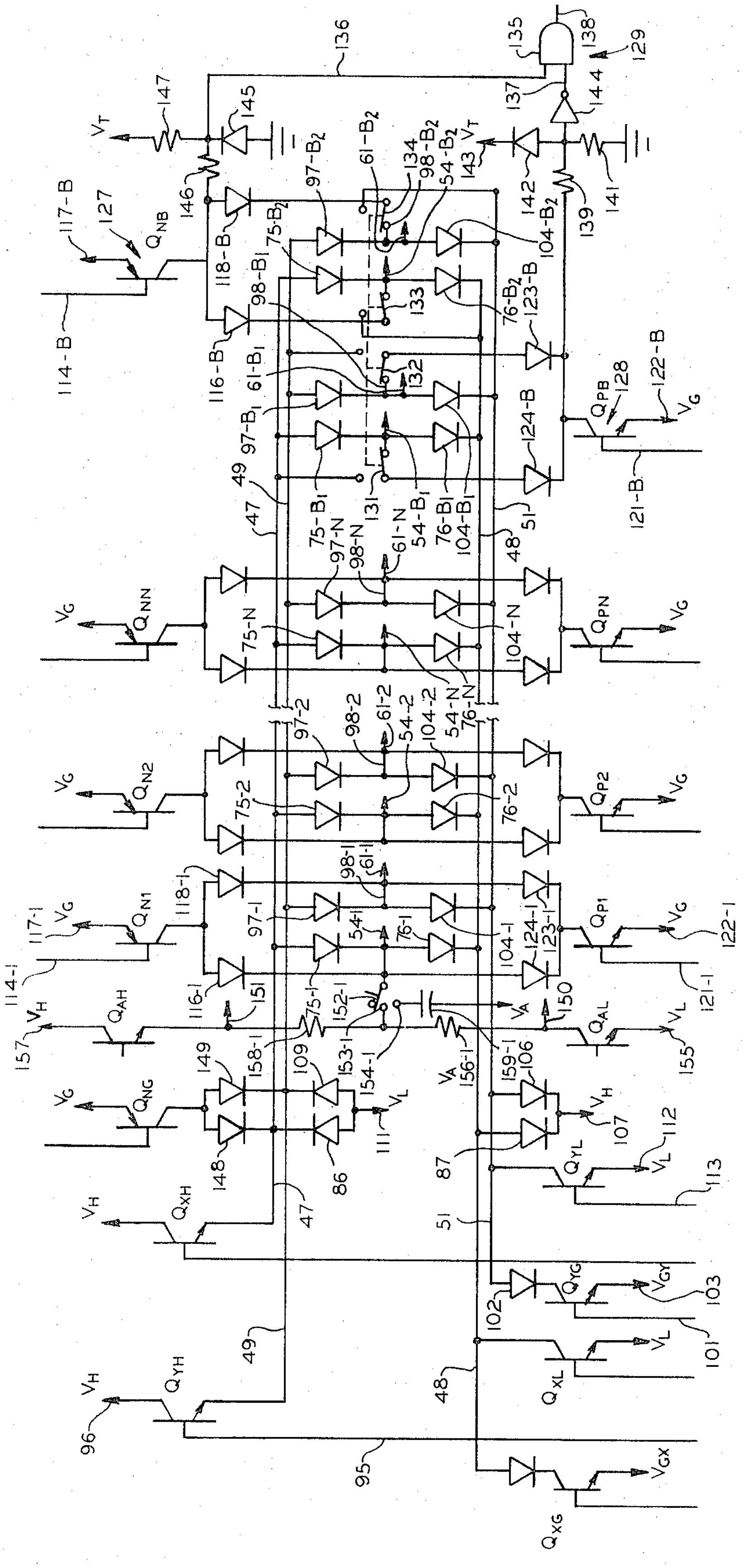
FIG. 9 is a schematic diagram of the circuit of FIG. 8 showing the address enabling means responsive to pre-addressed pull-to-ground circuits.

It should be noted that the sustainer component voltages are derived from bussed pull-up and pull-down circuits as generally shown in FIG. 3 and shown in more detail in FIGS. 7, 8 and 9. Each electrode of the *x* array 13 is connected to the pull-up buss 47 through an isolation diode 75 and a display connector line 54 (shown only for electrodes 13–1 and **13–*n* as indicated for suffixes 1** and *n*). Display connector line 54 is connected to the *x* pull-down buss 48 through isolation diode 76. The display connector lines are shown connected to single electrodes of the arrays 13 and 14 although they can be connected to a group of electrodes for an array where internal panel electrode multiplexing is employed. A pull-up circuit 77 acts as a selectively operable switch to couple souce $V_H$, applied at 78, to pull-up buss 47 while a pull-down circuit 79 acts as a selectively operable switch to connect terminal 81 coupled to a source at $V_L$ to the pull down buss 48. Corresponding pull-up and pull-down busses 49 and 51 are coupled to the *y* array electrodes by display connector lines, 61–1 as to 14–1 through isolation diodes and are controlled through *y* array pull-up and pull-down circuits to selectively apply voltages $V_H$, ground and $V_L$ in a manner corresponding to that shown for the *x* array in FIGS. 7 and 8.

The circuits of FIGS. 7 and 8 generally correspond. However, in FIG. 7 the sustainer pull-to-ground function is required for the low amplitude sustainer component wave form having transitions between $V_H$ and $V_G$ is provided by the pull-to-ground circuit 82 which also provides the partial select pull-to-ground function. Thus each circuit 82 is activated to ground the entire *x* electrode array in alternate half cycles of the sustainer component when that component is the low amplitude wave form. Such control is by the sustainer clocking and sychronizing functions of the control logic 44. In addition, when a ground partial select is required during the addressing of a cell to manipulate its discharge state, the pull-to-ground circuit 82 of the addressed cell in each array is activated through control logic 44. This dual function of circuit 82 requires that each such circuit have sufficient power handling capacity to accommodate the imposed sustainer component voltage, the capacitance charge of the electrode to which it is coupled, the buss capacitance charge and any residual junction charge in the pull-up or pull-down power transistors in circuits 77 and 79. A separation of these functions enables a lower capacity transistor switch to be employed for each electrode addressing circuit. Such separation is shown in FIG. 8 and in greater detail in FIG. 9.

In FIG. 8 a separate sustainer pull-to-ground circuit 83 is connected through an isolation diode 84 to pull-down buss 48 and is separately controlled as a part of the sustainer control by the control logic 44 so that only one high capacity pull-to-ground circuit is required. The individual electrode select pull-to-ground circuits 85 are controlled by control logic 44 during the addressing of the individual electrodes and need only the capacity to handle the capacitive charge of the electrode to which it is coupled, the buss capacitance, and any residual junction charge in the pull-up or pull down power transistors in circuits 77 and 79. This affords a substantial saving in large array panels.

The development of sustainer component wave forms and the resultant sustainer wave form across the panel 42 involves a sequence of operations of pull-up, pull-down and pull-to-ground circuits. A resultant sustainer as shown in FIG. 5 is developed by the control logic 44 turning on the pull-down circuit 79 for an interval sufficient for each electrode in the *x* array to attain $V_L$ to shift the *x* component from $V_H$ to $V_L$. Circuit 72 is then turned off. Next the *y* pull-to-ground circuit is turned on for an interval to pull all *y* electrodes to ground and then turned off. Depending on the pull-to-ground interval required, the pull-up circuit 77 for the *x* array is turned on either while the *y* pull-to-ground circuit is still on or shortly thereafter. Circuit 77 is maintained on for the interval required to bring all *x* electrodes to $V_H$ and then turned off. The *y* pull-up circuit is next turned on until the *y* electrodes are at $V_H$. This cycle is repeated until the interchange at time 71 when the *y* pull-down circuit is turned on while no change of *x* circuits is required. Thereafter the *x* array is controlled by its pull-to-ground and pull-up circuits and the $y$ array is controlled by its pull-down and pull-up circuits until the wave forms are again exchanged to return to the initial control cycle.

Addressing of individual cells is accomplished by pulling their electrodes to ground. The pull-to-ground circuit or addressing pulser of each electrode is individually controlled from the control logic 44 as determined by the selection logic 43 by turning on the pulser for an appropriate interval and then turning it off. These signals are applied during the time the sustainer components are at values other than ground. The other electrodes of the array having an addressed electrode are held at the sustainer value by the isolation diodes such that with electrode 13–1 at ground and buss 48 at $V_L$ the charge level on 13–2 is retained since diode 76–2 is poled to block flow through pull-down buss 48 and diode 75–2 is poled to block flow through pull-up buss 47. Inter-electrode capacitance to electrode 13–1 provides a limited path to ground from adjacent electrodes in the array to that some voltage drop on the unaddressed electrodes is present through the addressed and grounded electrodes. This slight discharge and voltage drop has been observed as up to 30%, part of which may be due to capacitive coupling external of the panel. However, such drops are well within the tolerable range for operation as a display/memory and cam be compensated for, when necessary, as will be discussed.

The pull-up and pull-down circuits are clocked in synchronism. Several control approaches are available. These circuits can be arranged to switch on and thus impose their respective potentials only while a control signal is imposed or they can be arranged to be switched on by one signal and hole the on condition until an off signal is imposed. In either event the diode isolated capacitance of the panel electrodes 13 and 14 retain the buss applied voltage on the cells even after the sustainer voltage is terminated.

Imposition of a sustainer voltage component on one electrode array establishes a charge level which tends to be displayed in response to transitions in the imposed sustainer component on the opposed electrode array. Since the symmetrical circuitry for each array permits each to be driven to levels $V_H$, $V_G$ and $V_L$ each array is subject to displacement currents as the opposite array makes transitions to $V_H$ or $V_L$. An escape path for such displacement currents is provided to clamped levels of $V_H$ and $V_L$ through their normally back biased clamping diodes 86 and 87 connected to busses 47 and 48.

In operation, as depicted in the wave form drawing, essentially square rise and decay patterns are represented with a slight slope to indicate some change with time and, when an interchange occurs, the transition of the component wave is made to the new level with only that slope. In FIG. 5 an interchange is illustrated for the condition in which both components are at the $V_H$ level so that the period of the normal $y$ component is transferred to and continued without shift along the time axis as the $x$ component from F to G. Thus the interval $V_H$ is imposed, J–K on the $y$ component, is now made up of two segments, L–M on the $y$ component and F–G and the $x$ component. Similar shifts from the $x$ component to the $y$ component at the moment of interchange will be noted.

It should be noted that it has been assumed in FIG. 5 that the pull-up and/or pull-down circuits are turned on by the clocking control at the moment of interchange of components. For example in FIG. 5 the $y$ component pull-up circuit had been turned on to raise the curve 22 to the $V_H$ level at L on the $y$ array 14. Since the $x$ array had been raised to level $V_H$ by pull-up circuit 77 at N while curve 21 is on the $x$ array and no potentials are required to be imposed to shift that level, a turn-on of pull-up circuit 77 at time F is unnecessary. Normal clocking of a pull-down circuit was sequenced at this time and the interchange merely causes pull-down circuit 79 to be turned on instead of the pull-to-ground circuit. However, if the component levels were different at the moment of interchange, the retention of sustainer component levels could be assumed by virtue of the capacitive storage of the isolated electrodes 13 and 14 or the control logic 44 could be effective on the pull-up or pull-down circuits to cause excursions to the levels programmed for that moment. For example, if the $x$ sustainer component were switched from wave form 21 to wave form 22 at the instant of time when the $y$ component was at $V_G$ and the $x$ component is at $V_H$, the $x$ component would be briefly pulled down to $V_G$. This assumes that even though the pull-to-ground circuitry may have been turned off following the transition on the $y$ array to $V_G$, the clocking control turns the $x$ array pull-to-ground circuitry on at the moment of interchange. It also assumes that the $y$ array pull-up circuit is turned on by the clock control at this time to raise the $y$ sustainer component to $V_H$.

A somewhat different mode of operation is assumed for the wave forms of FIG. 6 wherein the capacitive storage capability of the electrode arrays is relied upon to retain the signal levels imposed at the instant of interchange 88 until the next change in the new wave form is programmed by the clock control. This type operation results in a level $V_G$ in the time interval between 89 and 91 as established at time Z by the pull-to-ground circuitry rather than an excursion of the wave form to $V_H$, as would be the case if an exact exchange of wave forms were made. Similarly at the instant of re-exchange 92 of components to return to normal sustainer operation nö excursion of the $x$ component from $V_G$ to $V_H$ in the time interval between AA and BB is shown since pull-up circuit 77 is not turned on for that interval and the first turn-on for the $x$ component is of pull-down circuit 79 to impose $V_L$ as at CC.

Either form of clocking if the switching circuit operations can be employed. The results of the particular type of control can be constructed according to the principles illustrated above.

Generally, the interchange between electrode arrays 13 and 14 of sustainer components of dissimilar amplitudes, where $2V_H + V_L$ equals the resultant sustainer amplitude $2V_s$, will transfer cells in the off state to the on state. However, if the interchange is made at a time when the two components are at their most remote extremes the memory within the cells at that time is lost.

In order to accomplish a reliable inversion of states in the cells of a panel through interchange of applied sustainer voltage components, a transition of the extreme of the resultant sustainer voltage augmented by the wall charge voltage of the preinversion off state wall charge must be great enough to initiate a discharge to the on state of those cells which were in the off state prior to inversion. Further, those cells which were in the on state prior to inversion should not be subjected to a resultant sustainer voltage transition incidental to inversion sufficient to initiate or continue an on state discharge from the quiescent cell wall voltage established prior to inversion. If discharge activity of on state cells has not stabilized at the time of an excursion of the resultant sustainer voltage, the wall charge of the on state cells can be transposed to the post interchange on state level and all cells would then be on with a resultant loss of memory for the panel.

Consider the interchange at the moment one component is at $V_L$ and the other is at $V_G$. The component transitions are cumulative in the resultant sustainer voltage and, as a consequence the transition of the on cell wall charges augments a transition of 2 $(V_H + V_L)$ to continue the on state while the off cell wall charge transition is $2V_H + V_L$ or the usual sustainer level and transfers those cells to the on state. With all cells on memory is eliminated since reinversion will place all cells in the off state.

Reinversion of the inverted panel causes a turn off of the cells which were on during the inversion by discharging their wall charges to the off state level of a normal resultant sustainer prior to the transition of the normal resultant sustainer to its maximum opposite value. Also, the off state wall charge of cells in the off state during the abnormal resultant sustainer coincides with the on state wall charge of a normal resultant sustainer to cause the turn on of the cells which were off during inversion upon reinversion to the normal sustainer.

Where electronic conditioning is to be achieved by interchange of sustainer components of dissimilar amplitudes, the interchange can be made over a range of component relationships, provided a condition is established to maintain the wall charge level of the cells previously in the on state at the new off state level and the inversion occurs with sufficient frequency to insure particle activity, the presence of electrons 37, sufficient to provide for discharge ignition conditioning or priming. In a sustainer operating at the typical 50 kilohertz frequency and thus with a 20 microsecond sustainer voltage period, typically an interval of 16 normal periods between the inversion conditioning period is effective and provides adequate contrast in the display. However, it is to be understood that other ratios of normal cycles to abnormal cycles can be employed.

Where panel memory is to be retained, the moment of interchange becomes significant since it is desirable that the cells which were in an on state during the normal sustainer wave form will transfer to the off state and that cells which were previously in an off state will turn on as a result of the interchange. That is, it is desirable that the panel invert. In the assumed case inversion will occur if the interchange of sustainer components on the electrode arrays occurs when both components are at the same level, $V_H$ as in FIG. 5; and when one component is at the reference level, ground as in FIG. 6.

Control of the cells of the panel can be accomplished by erasing cells in the on state where electronic inversion is available. That is during a normal sustain cycle, a cell in the on state can be erased by imposing voltage impulses on the opposed electrodes of the cell to be erased at a time prior to the transition of the sustainer voltage to the next half cycle of alternation such that the charged particles are drawn from the cell walls and permitted to recombine leaving the cell walls essentially free of charges and at the neutral potential level. Since an inversion can be accomplished by an interchange of sustainer components, a cell can be written by inverting the panel, erasing that cell while in its inverted and thus on state, and reinverting the panel to return it to its normal state such that the cell is transferred from its off state to the on state.

A particularly advantageous manipulation of cell states in a panel can be accomplished with external addressing circuitry which imposes voltage transitions to ground to produce erase partial selects, the erasing voltage pulses being superimposed on the sutainer voltage. This is possible where the off state wall charge of an off state cell internal of the panel is other than the external ground.

FIG. 6 represents the transitions of wall charge and sustainer voltage for addressed cells manipulated by the erasure technique. Typically $V_H = \frac{2}{3}|V_L|$ so that 2 $V_s$, as previously defined for the case where $V_H$ is the amplitude for the smaller component and $V_H + V_L$ is the transition for the larger component, equals $2V_H + 3/2\ V_H$. A suitable value for 2 $V_s$ in currently available panels is 240 volts and with the above proportions $V_H = 68.6$ volts while $V_L = -103$ volts.

The erase pulse in the illustration is $V_H + |V_L| = 171.6$ volts above the bottom of the sustainer voltage. Assuming the off cell wall voltage to be 120 volts (midway between the sustainer extremes), the erase pulse is the equivalent of 171.6–120 or 51.6 volts above the off state cell wall voltage. For the typical cell geometry, gas composition and pressure this is known to be an effective value for the "erase pulse height". It is seen that this erase pulse height can be varied by varying the ratio $V_H/|V_L|$.

In employing grounding as a partial select signal the greatest partial select is $V_L$ above the bottom of the sustainer. Hence, this partial select is below the off state cell wall voltage by $-120 - V_L = 17$ volts, that is, below the mid-point of the sustainer voltage wave form 31. The partial select contribution required from the other component of the sustainer wave form is readily obtainable by pulling the 68.6 voltage of $V_H$ to ground, also providing a partial select below the off state. Since neither partial select is greater than the excursion of the resultant sustainer from the off state level, troublesome partial selects, which might marginally alter the state of cells having one electrode of the addressed cell, are avoided.

The special case assumed above can be generalized in that both $|V_H|$ and $|V_L|$ are usually less than $|V_s|$, the effective half sustaining voltage. $V_L$ can be slightly greater than $V_s$ with good operation. We note that $|V_H| < |V_L| < V_s$. This will be appreciated since if $|V_L| < |V_H|$ and if the select pulse at time $t_a$ of FIG. 6 will cause an erase, then the level shift of the sustainer without a select signal will, or at least may, at time $t_b$ cause cells which were inverted to the off state to write such that on inversion all cells would be erased. This type of response would erase the entire panel. That is, the cells having a pre-inversion on state would exhibit a wall voltage at level NN at time $t_c$ of FIG. 6 which would augment the inverted sustainer excursion at $t_b$ sufficiently to ignite a discharge. The cells thus would reinvert to an off state and the memory of their normal on state would be lost. Therefore, voltage $|V_L|$ must be sufficiently greater than $|V_H|$ so that the pulse at time $t_a$ erases but the sustainer voltage transition from neutral wall charge levels at time $t_b$ does not write. In the example, where $|V_H|=|V_L|/2$, the level of the sustainer voltage at time $t_b$ falls at the level of the normal sustainer and thus at the wall charge voltage level for cells in the off state. Such a transition of a sustainer, by definition, will not cause writing since it is not significantly beyond the normal off state wall voltage. Again, if $|V_H| = |V_L|/2$ the inversion of cells in the off state during the normal sustainer cycle is assured during the inverted sustainer cycle since the off state wall charge is displaced from the extreme transition of the inverted sustainer an amount equal to the normal sustaining voltage for on state cells.

When $|V_H| = |V_L|/2$ it is implicit that $|V_L| = V_s$. It is desirable to reduce voltage requirements on the sustainer voltage circuits. Such reductions are facilitated with $|V_L| < |V_s|$, however, this relationship is limited to levels which afford reliable operation in achieving a sufficient transition of sustainer voltage at the interchange of sustainer components to assure the amplitude from off state cell wall potential for normal operation will fire the normally off cells.

In addition to the use of asymmetric sustainer component wave forms and their interchange on the electrode arrays as a means of inversion for conditioning the panel by regular inversions, e.g. at a ratio of 16 normal sustainer cycles to each inverted sustainer cycle, the proposed wave forms are also effective as a reliable initial turn-on of the panel. The relatively low particle activity level in the ionizable gas requires substantial initial excitation. This wave form is particularly advantageous in this regard since a flash voltage is imposed on the panel at the first inversion which approximates $2\,(V_H+|V_L|) - V_s$ which for a $V_s$ of 120 volts is about 220 volts.

The manipulating signals illustrated in FIG. 6 are imposed when the wall charge voltage has approached a stabilized condition and thus typically about two to seven microseconds, for the assumed cell and operating parameters, after the sustainer voltage transition across the netural axis to an extreme. The width of the manipulating signal pulses along the time axis are also chosen to permit an approach to a stabilized condition of the newly developed wall charge, again a typical pulse interval has been illustrated as two to seven microseconds for the assumed cell and operating parameters. Stabilization of the wall charge conditions following a manipulating signal and prior to any major transition of the sustainer voltage is also advantageous in achieving reliable operation, thus as above, an interval of about two to seven microseconds between the termination of the signal and the sustainer transition is desirable.

As shown in FIG. 6 a succession of normal sustainer cycles maintain a stable panel condition with certain cells in an on state having a wall charge voltage as shown in plot 26. At time $t_a$ with the respective sustainer components at opposite amplitudes, specifically with the $x$ sustainer component at $V_L$ and the $y$ sustainer component at $V_H$, both components are drawn to ground on those $x$ and $y$ electrodes defining the on state cells. The cumulative voltage pulse resultant 28 across those cells draws their wall charge off the cell walls. At this time it is advantageous to avoid loading the select signal circuits 73 and 75 for each cell with the voltages and currents available from the sources $V_H$ and $V_L$, accordingly, it is advantageous to reduce the buss voltages immediately preceding the addressing of cells. One technique of making such a reduction is to turn off the pull-up and pull-down circuits and to pull the busses to ground, relying upon the panel electrode capacitances at the junctions of the isolation diodes 75 and 76 to maintain at their sustainer levels the signal levels of those electrodes of each array which are not pulled to ground by select signal circuits. Since the primary function of this operation is to discharge the capacitance of the busses, low power transistor switches can be employed for this function. FIG. 9 illustrates a circuit offering this feature.

One sequence of addressing is to turn-off the pull-up and pull-down circuits to the busses, pull the busses to or near ground, sense their pull to ground and in response thereto enable the addressing control logic to operate the addressed select signal circuits. The circuit of FIG. 9 includes this feature. A convenient technique providing an addressing window in the applied sustainer voltages is to have the pull-up and pull-down circuit off for a portion of each sustainer cycle as a regular element of their sequence of operations, and to clock addressing functions during that off interval.

The erase pulse width, height and position on the sustainer can be chosen in accordance with charge transfer curves to control the erase discharge pattern. As shown in FIG. 6, the erase pulse may be such as to cause various discharge patterns for the cell all of which can result in a transfer to the off state if properly stabilized. The cell can be discharged essentially to the neutral value, as shown by dotted curve 29*a*. It can be discharged to a level below neutral but in the off state range so that it drifts toward neutral in the remainder of the sustainer cycle or during subsequent cycles, as shown by double dot and dash curve 29*b*. It can be discharged to a level above neutral, as shown by the knee at 29, which can be high enough, if permitted to persist, to augment the next sustainer cycle sufficiently to rewrite the cell. In order to eliminate this wall charge overshoot 29 a reverse voltage can be imposed which tends to bring the wall charge of these cells toward the neutral level. This can be done by reimposing the $V_L$ voltage on the $x$ array through the turn-on of pull-down circuit 52 and/or reimposing the $V_H$ voltage on the $y$ array through the turn-on of pull-up circuit 59 to produce sustainer voltage levels below the wall charge neutral before the next excursion above the wall charge neutral. This will pull the wall charge of the just erased cells toward neutral sufficiently to militate against a reignition of discharge at $t_b$. To assure the wall charge of the just erased cell is reduced toward the neutral wall charge level sufficiently to avoid an involuntary discharge and to assure that no capacitive displacement voltages occur to cause an undesired discharge at the next resultant sustainer reversal it is necessary to clock a ground to the pull-up busses 47 and 49. This can be done with a low power pull-to-ground circuit isolated by diodes from the pull-up busses as illustrated in FIG. 9.

Cells are erased from the panel display by grounding the sustainer components during a normal sustainer cycle. They are written in response to signals from the user interface 41 to the selection logic 43, and the control logic 44 which cause a panel inversion by the described interchange of sustainer components between electrode arrays. The control logic 44 then clocks the buss grounding circuits and the select signal circuits for the addressed cells so that upon reduction of the buss levels the select signal circuits are enabled. It can then actuate means to insure the erased cells have their wall charge levels drawn toward the neutral wall charge level at PP and upon completion of the inverted sustainer cycle as at time 92 return to a normal sustainer cycle. Thus, the cells erased during inversion enter the on state or reinversion.

From the above it can be generalized that an erase pulse, whether applied during a normal sustainer cycle, or an inversion sustainer cycle is applied to the components in opposition to their then current excursions in magnitude at a level sufficient to develop an off state wall charge level. These erase pulses should be applied an interval following the transition from $V_H$ to $V_L$ on the appropriate array of electrodes sufficient to permit a reasonable stabilization of wall charge for on cells. The erase pulses and then attendant wall discharge to approach the neutral wall level should be completed before the transition from $V_L$ to $V_H$ on the appropriate array.

It is to be appreciated that the wave forms illustrated in FIG. 6 can be created by operations other than set forth above. For example, if the select signal circuits 52 and 53 have sufficient power handling capacity, buss pull-down is not a prerequisite to addressing. Further, if the erase pulse magnitude or interval of application is controlled precisely enough to bring the erased wall charge to the neutral wall charge level or so close to that level that involuntary reignition of a discharge in erased cells is avoided, no manipulation of buss voltages prior to the next sustainer excursion will be required. Accordingly, the simplified block diagram of sustainer and select signal circuitry of FIG. 3 as shown in greater detail in FIG. 7 will suffice.

In the circuit arrangements of FIGS. 7 and 8 the pull-up, pull-down and pull-to-ground circuits are essentially normally open switches, and advantageously are transistors with the reference voltage connected to the buss through the emitter-collector circuit of the transistor. In addition to the requirement that the transistor switch be turned on and off at the proper times, they must stand off a voltage of $|V_H| + |V_L|$ when turned off, and in the case of the pull-to-ground addressing circuits (the addressing pulsers) they must have the power handling capacity to accommodate the pull-down of the buss and its substantial associated capacitance including that in the switching transistors of the sustainer component.

A further refinement of the separated sustainer and addressing circuits of FIG. 8 is shown in the schematic diagram of FIG. 9 where the circuits are arranged to avoid imposing the buss capacitance on the pull-to-ground addressing switches. Pre-address-pull to ground pulsers in the form of switches are coupled to the busses to discharge the buss capacitances slightly prior to and as a requisite condition to addressing any electrodes in the panel.

A number of transistor switches are disclosed in FIG. 9 to apply the pull-up and pull-down voltages to the busses and the addressed electrodes. The circuitry controlling these switches has not been detailed. Typical circuits for rapid turn-on and turn-off of transistor switches of this type are disclosed in the co-pending application for U.S. Letters Patent. Ser. No. 313,348 filed Dec. 8, 1972 entitled "Transistor Control Apparatus" by Edwin F. Peters.

Two forms of operation of the multicelled gaseous discharge display/memory panel are contemplated, one employing electronic conditioning over the entire panel by periodic inversion of the panel through interchange of the sustainer components and the other employing a continuously discharging border. These conditioning means can be combined and are illustrated in FIG. 9 as combined with the understanding that one might be eliminated.

Control logic 44 applies signals to switching circuits in the sustainer controls 45 and 46 to control the transistor switches in accordance with the wave forms previously discussed. For example, for normal resultant sustainer wave forms as shown in FIG. 5 the *y* array 14 is switched between $V_H$ and ground and the *x* array 13 is switched between $V_H$ and $V_L$. Periodically these sustainer wave forms are interchanged if electronic conditioning is employed. In manipulating cells between the on and off state addressing signals of the erase type are applied in proper time spaced relation to panel inversions by interchange of the wave forms as controlled by the selection and control logic.

The transistor switches of the buss circuits for the *x* and *y* arrays are designated in FIG. 9 by first subscripts X and Y respectively and second subscripts for the voltage level they represent. Thus pull-up transistors QXH and QYH are turned on to apply $V_H$ to the *x* and *y* pull-up busses 47 and 49, pull-down transistors $Q_{XL}$ and $Q_{YL}$ are turned on to apply $V_L$ to the *x* and *y* pull-down busses 48 and 51 and the pull-to-ground transistors $Q_{XG}$ and $Q_{YG}$ are turned on to ground the *x* and *y* pull down busses. The addressing transistor switches are common to the *x* and *y* circuits and thus are not designated with X and Y subscripts but rather have subscripts indicating the polarity of the signal they operate on as P for a select signal which pulls positive sustainer component negatively and N for a select signal which pulls a negative sustainer component positively. A second subscript designates a function or an element with which the transistor switch is associated. Pre-address transistors $Q_{NB}$ and $Q_{PB}$ respectively pull the *x* and *y* pull-down busses 48 and 51 positive toward $V_G$ and the *x* and *y* pull-up busses 47 and 49 negative toward $V_G$ and also are the means of applying partial select signals for inversion of a border of cells where such cells are employed for panel priming. Partial select signal transistor switches are designated by a second subscript representing the electrode of the arrays which they control as $Q_{P1}$ and $Q_{N1}$ for the 1 electrodes or electrode groups of each array through $Q_{P2}$ and $Q_{N2}$ and so forth to $Q_{PN}$ and $Q_{NN}$ for the 2 . . . N electrodes of the arrays. A transistor switch $Q_{NG}$ is effective on the pull-up busses 47 and 49 to accommodate displacement currents due to sustainer component excursions to $V_G$ as will be explained.

In operation the *y* pull-up buss 49 is raised to voltage $V_H$ by turning on transistor $Q_{YH}$ by means of a signal applied from control logic 44 to its base on lead 95 whereby its collector-emitter circuit applies $V_H$ at terminal 96 to buss 49. Typically $V_H$ is at a suitable positive level such as 70 volts. The positive potential imposed on buss 49 is passed to all *y* electrodes through electrode isolation diodes **97–1, 97–2 . . . 94–*n*** of the *n* electrodes in array 14 to the interconnections **98–1, 98–2 . . . 98–*n*, and display connector line 61–1, 61–2 . . . 61–*n* to the electrodes 14–1, 14–2 . . . 14–*n*** respectively. Where border conditioning is utilized, the *y* borders on each side of the panel defined by $y$ electrodes $B_{y1}$ and $B_{y2}$ (not shown) are also subject to the pull-up voltage $V_H$ through diodes 97–$B_1$, and 97–$B_2$, interconnections 98–$B_1$, and 98–$B_2$ and display connector lines 61–$B_1$ and 61–$B_2$.

Ground is imposed on the $y$ array after turning off transistor $Q_{YH}$ to remove $V_H$ from pull-up buss 49 by turning on transistor $Q_{YG}$ to pull-down $y$ pull-down buss 51 to ground, all in response to appropriate signals from control logic 44 to the base connections 95 and 101, and for turn-off of $Q_{YH}$ where the aforenoted Peters' controls may be employed, through base-collector circuitry (not shown). Diode 102 blocks a forward bias from ground to the more negative $V_L$ voltage applied through $Q_{YL}$.

Ground $V_G$ is chosen at about 1.0 volt positive to facilitate direct control of addressing from transistor-transistor logic (not shown) for both the n-p-n and p-n-p transistors of the addressing pulsers. It is applied to the emitter of $Q_{YG}$ at terminal 103, thence through the emitter-collector of $Q_{YG}$ and blocking diode 102 to buss 51. From buss 51 ground is passed to electrodes 14–1, 14–2 . . . 14–$n$ and 14–$B_1$ and 14–$B_2$ via electrode isolation diodes 104–1, 104–2 . . . 104–$n$ and 104–$B_1$, and 104–$B_2$ to interconnections 98–1, 98–2 . . . 98–4 $n$ and 98–$B_1$ and 98–$B_2$ for the display/memory cells of the panel as well as the conditioning border. The effect of this circuit is to permit the charge on the electrodes of array 14 to flow to ground $V_G$ through leads 98, diodes 104, buss 51, diode 102, and transistor $Q_{YG}$ when it is on.

Return of the $y$ component wave form of the sustainer to $V_H$ is again controlled by the clocking from control logic 44 to base control leads 95 and 101 such that transistor $Q_{YG}$ is turned off prior to the turn on of $Q_{YH}$.

Transitions of the sustainer components tend to cause displacement of the voltage levels established on the opposite arrays since they are capacitively connected. Thus at time $t_p$ of FIG. 5 the $y$ component is shifted from the $V_G$ to the $V_H$ level. This tends to raise the potential of the $x$ array which is at $V_H$ at this time by an additional $V_H$. However, this increase in potential results in a forward bias on diodes 76 to buss 48 and to clamping diode 87, poled to pass current from buss 48 and back biased by $V_H$ at 107, and therefore current will flow in response to any voltage increased above the back bias or clamping potential $V_H$ to maintain the electrodes of the $x$ array at $V_H$. When the $y$ sustainer component is shifted from $V_H$ to $V_G$ as at time $t_n$ in FIG. 5, the $x$ electrodes tend to be shifted from their $V_L$ level to a more negative voltage. Diode 86, back biased by $V_L$ and poled to pass current from $V_L$ to pull-up buss 47, prevents this displacement since, as the $x$ electrodes become more negative than $V_L$, the source $V_L$ at 111 supplies current through diode 86 to buss 47, diodes 75 and display connector lines 54 to those electrodes. Similarly, a shift in the $x$ sustainer component from $V_L$ to $V_H$ tends to raise the $y$ array potential from its then current $V_G$ level. As the $y$ electrodes tend to become more positive than $V_H$, diodes 104 and 106 are forward biased and the charge flows out of the electrodes to prevent the voltage increase.

Displacement currents are also significant when a cell has been addressed by partial select pulses to $V_G$ hence diodes 148 and 149 are poled to pass current to pull up busses 47 and 49 and have their anodes selectively connected to $V_G$ through normally open transistor switch $Q_{NG}$. Switch $Q_{NG}$ is closed at the end of address pulses to pull the pull-up buss which is low with respect to $V_G$ up to voltage $V_G$.

Upon interchange of sustainer components, the normal $x$ component wave form is imposed on the $y$ array 14 so that the wave form transitions are between $V_H$ and $V_L$. Under these circumstances the control logic shifts to the cycle base normally employed for the $x$ component and utilizes $Q_{YH}$ as the switch for imposing $V_L$. In the case of $V_L$, it is applied at terminal 112 of the emitter of $Q_{YL}$ so that when control logic 44 causes a turn on signal to be imposed on base lead 113 pull-down buss 51 is pulled to $V_L$ at a suitable value below ground, for example about −110 volts.

Two manipulations of the individual cells are performed through the operation of the select switching transistors. The individual cells are erased by imposing ground partial select signals during a normal sustainer cycle and are written by inverting their cell array, erasing the cell while inverted and then reinverting their cell array. Thus only a cell erasure manipulation need be considered with respect to these circuits. As shown in FIG. 6 the sustainer component having the large amplitude wave form is manipulated by a partial select signal which pulls the sustainer component level of the addressed electrode from $V_L$ to ground in a positive direction while the sustainer component level of the addressed electrode subject to the small amplitude wave form receives a negative going partial select signal which pulls it from $V_H$ to ground. During a normal sustainer cycle, the $x$ sustainer component has the large amplitude and the $y$ sustainer component has the small amplitude so that an erase signal is applied to an $x$ electrode as a positive going signal through the p-n-p transistor switches $Q_{X1}$ . . . $Q_{XN}$ and those switches are only effective on $x$ electrodes while a $y$ electrode has a negative going partial select signal imposed through n-p-n transistor switches $Q_{P1}$ . . . $Q_{PN}$ and those switches are only effective on $y$ electrodes. Conversely, when the sustainer component wave forms are interchanged the positive going select signals from $Q_{X1}$ . . . $Q_{XN}$ are effective only on the $y$ electrodes and the negative going select signals from $Q_{P1}$ . . . $Q_{PN}$ are effective only on the $x$ electrodes. Thus each select switch is connected to one display connector line to each electrodes array yet during any given addressing operation it is effective on that line in only one array. Diodes 116 and 118 are poled to pass current from the address pulsers $Q_{X1}$ . . . $Q_{XN}$ to their display connector lines when their respective array is at a voltage below $V_G$ and to block signals to their display connector lines when their respective array is high with respect to $V_G$. Address pulser signals from $Q_{P1}$ . . . $Q_{PN}$ are directed to the display connector lines of the array which is high relative to $V_G$ by diode 123 and 124 poled to pass current from the display connector lines to the pulsers.

Consider the addressing of the cell comprising proximate portions of electrodes 13–1 and 14–1 for an erase function, indicated to be performed during a normal sustainer cycle of FIG. 6. A turn on of $Q_{X1}$ at lead 114–1 pulls the low sustainer component up to ground as at 115 of FIG. 6 from the $x$ array electrode 13–1 through display connector line 54–1, diode 116, and transistor $Q_{X1}$ collector-emitter circuit to the terminal 117 at ground level $V_G$. Base lead 114 to transistor $Q_{X1}$ is energized from selection logic 43 and control logic 44 through lead 65 by pulser selection signals from transistor-transistor logic zero level pulses developed either intermediate lead 64 and 114–1 or within the control logic, in which case lead 65 is connected directly to 114–1. It will be appreciated that while the turn on of $Q_{N1}$ is available to the *y* array through diode 118–1 corresponding to diode 116–1, its turn on is ineffective at this time since the *y* sustainer component is at a high voltage, $V_H$, during the interval $Q_{N1}$ is on and 118–1 blocks any current from the electrode 14–1 of that array.

Electrode 14–1 is pulled down to ground as shown at 119 of FIG. 6 by the clocking of transistor switch $Q_{P1}$ when a pulser selection signal, as a transistor-transistor logic "one" level pulse, is applied to base lead 121–1. This couples the terminal 122–1 held at $V_G$ through the emitter-collector circuit of $Q_{P1}$ and diode 123–1 to display connector line 61–1 and thence to electrode 14–1. At this time the *x* sustainer component is low relative to $V_G$ hence diode 124–1 is back biased and $Q_{P1}$ turn on has no effect on electrode 13–1.

A write select signal is effective in a corresponding manner but on the opposite arrays since the control logic clocks turn on signals to leads 114 and 121 only after the panel has been inverted at time 88 of FIG. 6 and while the *y* sustainer component is at $V_L$ and the X sustainer component is at $V_H$. The write signal, an erase during the interval the panel is electronically inverted, all as controlled by the selectron and control logic 43 and 44, results in a negative going pulse to ground as at 125 of FIG. 6 by $Q_{P1}$ drawing down the voltage on 13–1 from display connector line 54–1 through diode 124–1. Electrode 14–1 is pulled-up to ground at this time as shown at 126 of FIG. 6 by the turn on of $Q_{N1}$ and current flow from display connector line 61–1 through diode 118–1 and $Q_{N1}$.

As specified above, the partial select signals can be controlled by transistor-transistor logic and relatively low power transistors of the $Q_N$ and $Q_P$ families where the power requirements imposed on the transistors are maintained at acceptable levels. While the pull-up and pull-down switches are turned off at the time a cell is addressed with partial select signals, some charge can persist on the switching transistor junctions as at $Q_{YH}$, $Q_{XH}$, $Q_{YL}$ and $Q_{XL}$ and on the busses 47, 48, 49 and 51 which, if not eliminated at the time the address pulsers are turned on, will have to be accommodated by those pulsers. Such charge is eliminated in the system of FIG. 9 by pre-address pulsers 127 and 128 and the elimination of that charge is sensed by a monitor 129 which issues an enable signal to the circuits issuing clocking signals to the address pulsers.

Alternative forms of pre-address pulser circuits are shown wherein the four ganged single pole double throw switches 131, 132, 133 and 134 in the illustrated position perform the dual function of addressing the panel priming borders while discharging buss capacitances and in the alternative position only discharge the buss capacitances. With the switches as shown the application of a logic one to base lead 121–B pulls the high buss and the high border electrodes down to $V_g$ and application of a logic zero to base lead 114–B pulls the low buss and the low border electrodes up to $V_g$. The circuit accommodates a panel having two border electrodes in each electrode array, as *x* electrodes $13\text{–}B_1$, and $13\text{–}B_2$ and *y* electrodes $14\text{–}B_1$ and $14\text{–}B_2$, arranged so that one *x* and one *y* electrode is high when the other in its array is low. In this manner one set of border electrodes and the cells they define are in an on state while the other set is in the off state as determined by the application of erase pulses either during a normal sustainer or an inverted sustainer cycle as the panel is initially placed in operation. This assures some border cells in the on or panel priming condition at all times during panel operation.

The pulsers 127 and 128 function in the same manner as the address pulsers. When a cell is addressed either for an erase or write function, the control logic clocks an on signal to base leads 114–B and 121–B after the sustainer component switches $Q_{YH}$, $Q_{XH}$, $Q_{YL}$ and/or $Q_{XL}$ have been turned off and before the address pulsers are clocked on. For example, with the *x* component at $V_H$ at this time, any residual charge on the buss 47 is pulled to ground through diode $75\text{–}B_1$, to switch 131 diode 124–B and on transistor $Q_{PB}$ to terminal 122–B at $V_G$. The gating of $Q_{NB}$ at this time pulls *y* buss 51 up to ground $V_g$ through diode 104–B2, switch 134, diode 118–B and $Q_{NB}$ to terminal 117–B. These gated switches are also effective to pull down border electrode 13–B1 through lead 54–B1 switch 131, diode 124–B and $Q_{PB}$ and border electrode 14–B2 through lead 61–B2 switch 134, diode 118–B and $Q_{NB}$.

If border conditioning is not employed leads 54–B1, 61–B1, 54–B2 and the diodes 75–B1, 76–B1, 97–B1, 104–B1, 75–B2, 76–B2, 97–B2 and 104–B2 can be omitted, as would be the case with switches 131, 132, 133 and 134 in the alternate position to that shown so that diodes 116–B and 118–B were directly connected from $Q_{NB}$ to pull-down busses 48 and 51 and diodes 123–B and 124–B were directly connected from $Q_{PB}$ to the pull-up busses 47 and 49. In this arrangement the pull-down and pull-up paths follow only a portion of the path traced above.

Monitor 129 responds to the reduction of the buss voltages below a predetermined value set by the ratio of resistors 139 and 141 and TL gate 144 input parameters. AND 135 responds to coincident logic one signals on its inputs 136 and 137 to issue a logic 1 at 138 as an enabling signal for the address pulsers, as through control logic 44. The collector of $Q_{PB}$ is indicated to have dropped the pull-up busses near to $V_G$ when the drop in the voltage divider made up of the resistors 139 and 141 falls to a logic zero on the input to inverter 144 to issue a logic one to input 137 of AND 135. Diode 142 clamps the input to gate 144 to $V_T + 0.7$ volt, this protecting the gate from higher voltages. When the low level pull-down buss is pulled-up nearly to $V_G$, the voltage drop for current from ground through diode 145 and resistor 146 is exceeded by $V_T$ applied through resistor 147 to impose a logic one on 136 to AND 135. Thus with all busses below a predetermined voltage and essentially discharged, AND 135 issues a logic one address pulser enable signal on lead 138.

In the discussion of address pulse wave forms it was noted that it is possible under certain operating conditions to impose spurious write pulses attributable to displacement currents which persist as the result sustainer wave makes a transition to the opposite polarity and thus continues or reinitiates the discharge of the erased cell to produce an opposite wall charge at or near the on cell wall charge level. Such spurious responses are prevented for even marginal operating conditions by a displacement current pulser in the form of transistor switch $Q_{NG}$ which is clocked on by the control logic at the termination of the address pulse to impose $V_G$ on the pull-up buss and thus on the appropriate axis electrodes through diodes 75- or 91- even if a displacement current would tend to place their voltage levels at a lower potential. $Q_{NG}$ is clocked on during the interval bounded by the end of the erase pulse and the next major transition of the sustainer voltage, between times $t_{m1}$ and $t_{m2}$ of FIG. 6. As with the address, and pre-address pulsers, the displacement current pulser pulls either pull-up buss to $V_G$ through diode 148 for buss 47 and 149 for buss 49.

Panel interelectrode capacitance can be tolerated generally with the broad operating margins offered by existing panel constructions. However, where the panel parameters and circuit requirements are such that interelectrode capacitance of the magnitudes experienced, typically resulting in voltage drops in unselected lines proximate to selected lines of up to about 30%, is unacceptable, a corrective circuit can be utilized to maintain the levels on the unselected electrodes. Such circuits may also be employed where multiple, but not all, electrodes are selected for addressing, as in prior art parallel address schemes.

Two forms of such maintainer circuits are shown in FIG. 9 for a typical display connector line 54 for the *x* electrode. Generally, the maintaining circuits provide an augmenting voltage source coupled to each display connector line of one or both electrode arrays of the panel and they are arranged so that the addressed electrodes in that array can be pulled-to-ground by their address pulsers overcoming the augmented voltage. A switch 152 is shown for the display connector line 54–1 to electrode 13–1 of the *x* array with its blade in the open circuit condition indicating the maintainer circuits are disconnected. The alternative use of maintainer circuits of the active and passive type are represented and would be effective with switch 152 at contact 153 and 154 respectively. It is to be understood that maintainer circuits would be applied to other *x* array display connector lines and that the single circuits illustrated are merely representative of the plural circuits intended for the maintainer function.

The active maintainer circuit connected when switch 152 engages contact 153 comprises a pull-up and pull-down transistor switch controlled by a base turn on signal from control logic 44 sequenced to be applied at the time any address pulser is turned on. The switch employed will depend upon the sustainer component level imposed on the array having the maintainer circuit at the time the address pulser is turned on. Thus, if as shown in FIG. 6 for an erase signal the *x* component is at $V_L$ when erase partial select pulse 115 is applied, the maintainer pull-down transistor switch $Q_{AL}$ will be turned on to connect terminal 155 at $V_L$ through its emitter-collector circuit and a limiting resistor 156–1 to contact 153, switch 152 and display connector line 54–1 whereby electrode 13–1 is held at $V_L$ even though a ground partial select signal 115 has been applied to an electrode in its vicinity. If, on the other hand, a write partial select (an erase during panel inversion) is applied, the *x* array will be at $V_H$ and the maintainer pull-up transistor switch $Q_{AH}$ will be turned on to connect terminal 157 at $V_H$ through its collector-emitter circuit and a limiting resistor 158–1 to contact 153, switch 152 and display connector line 54–1 whereby electrode 13–1 is held at $V_H$ even through a ground partial select signal 125 has been applied to an electrode in its vicinity. Each of the *x* array electrodes is similarly connected through limiting resistors to the maintainer switches $Q_{AL}$ and $Q_{AH}$ from the arrow-headed leads 150 and 151, respectively, and is pulsed as set forth. Those electrodes addressed with a partial select are not adversely affected since the limiting resistor 156 or 158 in series with that electrode will drop the maintainer voltage and the address pulser will overcome its effect. Alternatively maintainer switches $Q_{AL}$ and $Q_{AH}$ can be connected to a common bus (not shown) corresponding to the busses 150 and 151. That common buss can be coupled to each display connector line 54 of the *x* array through a single limiting resistor (not shown) corresponding to resistors 156 and 158. Such common circuitry can be employed, the control logic would program operation of only one of the switches $Q_{AL}$ or $Q_{AH}$ for a given condition.

The passive maintainer circuit employs capacitive storage. With switch 152 connected to contact 154, capacitor 159 is in circuit with the electrode so that it is charged to a level by the currently applied sustainer and is partially discharged to the electrode to maintain that applied sustainer level when an adjacent electrode is addressed with a ground partial select. The capacitance of each capacitor 159 is such that it will not swamp the address pulser when that electrode is addressed hence partial select pulses are not adversely affected by the passive maintainer circuit.

In the above detailed description address pulsers for the display connector lines, pre-address pulsers for the busses, the displacement current switch display connector line voltage maintenance pulsers, the buss pull-up, pull-down and pull-to-ground circuits have all been illustrated as transistors coupling unidirectional sources to the various circuits. It is to be appreciated that other forms of selectively closed normal open switch elements can be employed in place of these transistors. Blocking and isolating diode rectifiers have been described. Other types of unidirectionally conductive devices can be substituted for the blocking and isolating functions.

While like voltage levels are employed in symmetrical circuits both for sustainer and addressing functions the methods of operation and circuits for practicing those methods need not be so restricted. Thus different high voltages can be employed for the *x* and *y* components instead of the equal $V_H$ maximum positive going excursions illustrated and different low voltages can be substituted for the equal $V_L$ levels, all provided the total applied in each instance is at least the sustainer voltage magnitude required of the cells and panel. Further, while $V_G$ at about 1 volt positive from external ground has been employed as the reference voltage level and the level of partial select pulses issued by addressing pulsers, pre-address pulsers, and sustainer reference, other reference voltage values can be selected. Reference voltages near external ground have the advantage of accommodating TTL logic signals as to the addressing pulsers without requiring isolating or voltage level shifting components hence the ground or near ground values of reference levels are of particular advantage with respect to circuits cooperating with those illustrated.

Addressing pulsers perform the dual function of addressing rspective display connector lines for both conductor arrays. The alternating sustaining voltage on busses 47, 48, 49, and 51 for the *x* and *y* arrays places one array at a high voltage during a first time interval of the sustainer period in which the second array is at a low voltage and during an inversion or second time interval reverses those relative levels. The array conductors and their display connector lines follow these voltage levels and retain them until the sustainer is imposed at a new level. Addressing pulsers such as $Q_{X1}$ . . . $Q_{XN}$ and $Q_{P1}$ . . . $Q_{PN}$ are provided to pull the voltage on a display connector line in a given direction toward a value intermediate the relatively high and low sustainer voltages imposed. Each pulser has a unidirectional conductive means, diodes 116 and 118 for pull-up pulsers and diodes 123 and 124 for pull down pulsers, coupling each to a respective display connector line for each array. These diodes are poled to pass signals to the display connector line when that line is at a voltage dictated by the sustainer which is displaced opposite the pulser signal direction from the intermediate value so that a pull-up pulser is effective on the line of the array which is at a voltage below the intermediate value through the diode while the other diode blocks its signal to the line of the high array. The pull-down pulser is effective only on the high display connector line because of its diodes. The addressing circuit is arranged to selectively actuate the pulsers in synchronism with the first and second time intervals of the sustaining voltage so that only a predetermined one of the two display connector lines connected to the pulser receives the addressing pulse. The line which has its voltage displaced opposite the signal direction of the pulser from the intermediate value will have its voltage pulled in the pulser signal direction toward that intermediate value while the other line is not subject to the pulser signal at this time.

The system is applicable as a suitable means of energizing and erasing cells in the on state of discharge by addressing pulsers pulsing to a reference level as $V_G$ even without inversion. This can be done with dissimilar sustainer components and with addressing pulsers to $V_G$ using the various features of buss pre-address pulsing, selective switching for accommodation of displacement currents, border conditioning, and display connector line potential level maintenance as disclosed. Such operations and circuits have utility in conjunction with conventional write address pulsers which impose pulses augmenting the sustainer voltage to fire selected cells. The techniques and apparatus can also be used with techniques of panel inversion employing a shifted d-c base level for the resultant sustainer as a means of inverting the panel and thus utilizing the erase process for writing.

In view of the alternatives and variations employing the concepts of the present invention which are available, it is to be appreciated that the above detailed disclosure is presented as merely illustrative of the invention and is not to be read in a limiting sense.

What is claimed is:

1. In a circuit for controlling a multicelled, gas discharge, display/memory panel of the type in which a discharge in an enclosed ionizable gas generates charges of alternate sign collectable on discrete areas of dielectric surfaces which are backed by portions of conductors of a first conductor array which are proximate portions of conductors of a second conductor array, each of said proximate portions of respective conductors of said first and second arrays defining a discharge cell: first means for generating a first periodic pulsating sustaining voltage component of a first amplitude; second means for generating a second periodic pulsating sustaining voltage component of a second amplitude greater than said first amplitude, the sum of the absolute values of the first and second amplitudes at least equalling the amplitude of the sustaining voltage for said cells; and means for applying the first component to said first conductor array and the second component to said second conductor array with the first and second components so phased as to periodically impose and alternate the sustaining voltage of the cells across the opposed discrete charge storage areas.

2. A circuit according to claim 1 wherein said first generating means includes means to pull up said first sustaining voltage component to a high value, and means to pull-down said first sustaining voltage component to a low value; and wherein said component applying means includes a first plurality of display connector lines each connected to a conductor of said first array; a pull-up undirectionally conductive device connected between said first voltage component pull-up means and a display connector line of said first plurality and poled to pass current from said voltage pull-up means to said display line; and a pull-down unidirectionally conductive device connected between said voltage pull-down means and a display connector line of said first plurality to which a pull-up unidirectionally conductive device is connected, said pull-down device being poled to pass current from said display connector line to said voltage pull-down means.

3. A circuit according to claim 2 wherein said second generating means includes means to pull-up said second sustaining voltage component to a value above the low value of said first sustaining voltage component, and means to pull down said second sustaining voltage component to a low value below the low value of said first sustaining voltage component; and wherein said second component applying means includes a second plurality of display connector lines each connected to a conductor of said second array, a pull-up undirectionally conductive device connected between said voltage pull-up means for said second means and a display connector line of said second plurality and poled to pass current from said voltage pull-up means to said display connector line; and a pull-down unidirectionally conductive device connected between said voltage pull-down means for said second component and a display connector line of said second plurality to which a pull-up unidirectionally conductive device is connected, said pull-down device being poled to pass current from said display connector line to said voltage pull-down means.

4. A circuit according to claim 3 wherein said second sustaining voltage pull-up value is at least said first sustaining voltage pull-up value and said second sustaining voltage pull-down value is at least the absolute value of said first sustaining voltage pull-up value.

5. A circuit according to claim 3 including a pull-up buss connecting said first sustaining voltage component pull-up means to a plurality of said pull-up unidirectionally conductive devices for said display connector lines of said first plurality; a pull-down buss connecting said second sustaining voltage component pull-down means to a plurality of said pull-down unidirectionally conductive devices for said display connector lines of said second plurality; a low biasing source of said second sustaining voltage component low value; a clamping unidirectionally conductive device connected between said low biasing source and said pull-up buss poled to pass current from said biasing source to said pull-up buss; a high biasing source of said first sustaining voltage component high value; and a clamping unidirectionally conductive device connected between said high biasing source and said pull-down buss poled to pass current from said pull-down buss.

6. A circuit according to claim 3 wherein the potential difference between said second sustaining voltage pull-up value and said first sustaining pull-down value is at least the potential difference between said first sustaining voltage pull-up value and said first sustaining pull-down value and the potential difference between said second sustaining voltage pull-down value and said first sustaining voltage pull-down value is at least the amplitude of the potential difference between said first sustaining voltage pull-up value and said first sustaining voltage pull-down value.

7. A circuit according to claim 3 including an addressing circuit for selecting individual ones of said display connector lines coupled to conductors of said first and second arrays; unidirectional voltage pulse generating means controlled by said addressing circuit for producing pulses on selected display connector lines coupled to conductors in said first and second arrays to said low value of said first sustaining voltage component at a time said first component is at a high value and said second component is at a low value whereby the discharge state of the cell defined by said pulsed conductors is transferred from an "on state" to an "off state".

8. A circuit according to claim 7 including means to compensate for the tendency to shift the voltage level of first conductors which are not subjected to voltage pulses from address selection controlled unidirectional pulse generating means, said tendency being in response to voltage pulses from address selection controlled unidirectional pulse generating means for other conductors of said arrays which are capacitively coupled to said first conductors, comprising: a source of reference voltage; and a capacitance coupled between said reference voltage source and said first conductors whereby the sustainer voltage component applied to said display connector lines charges said capacitance to store charge for release to said first conductors.

9. A circuit according to claim 7 including means to compensate for the tendency to shift the voltage level of first conductors which are not subjected to a voltage pulse from address selection controlled unidirectional pulse generating means, said tendency being in response to a voltage pulse from address selection controlled unidirectional pulse generating means for other conductors, comprising: second unidirectional voltage pulse generating means controlled by said addressing circuit for producing voltage pulses to the sustainer component level effective on said first conductors at the moment the voltage pulse to be compensated is applied to the other conductors; and limiting means between said second unidirectional voltage pulse generating means and said first conductors.

10. A circuit according to claim 7 including a first pull-up buss connecting said first sustaining voltage component pull-up means to a plurality of said pull-up unidirectionally conductive devices for said display connector lines of said first plurality; a first pull-down buss connecting said first sustaining voltage component pull-down means to a plurality of said pull-down unidirectionally conductive devices for said display connector lines of said first plurality; a second pull-up buss connecting said second sustaining voltage component pull-up means to a plurality of said pull-up unidirectionally conductive devices for said display connector lines of said second plurality; a second pull-down buss connecting said second sustaining voltage component pull-down means to a plurality of said pull-down means to a plurality of said pull-down unidirectionally conductive devices for said display connector lines of said second plurality; unidirectional voltage pulse generating means controlled by said addressing circuit for producing pulses on said busses to said low value of said first sustaining voltage component at a time prior to operation of said pulse generating means for selected lines and while said first sustaining voltage component is at a high value and said second sustaining voltage component is at a low value whereby capacitive effects associated with said busses are minimized on said pulse generating means for selected display connector lines.

11. A circuit according to claim 10 including means for sensing the voltage levels on said busses for indicating the voltages on said busses are within a predetermined range of said low value of said first sustaining voltage component.

12. A circuit according to claim 11 including means to issue an enabling signal to said unidirectional voltage pulse generating means for producing pulses on selected display connector lines in response to the reduction of said voltages on said busses to said predetermined range.

13. A circuit according to claim 1 including means for generating a third periodic pulsating sustaining voltage component of a third amplitude; means for generating a fourth periodic pulsating sustaining voltage component of a fourth amplitude greater than either of said first third amplitudes, the sum of the absolute values of the third and fourth amplitudes at least equalling the amplitude of the sustaining voltage for said panel; means for applying said fourth component to said first conductor array and said third component to said second conductor array simultaneously with said fourth and third components so phased as to periodically impose and alternate the sustaining voltage of the cells across the opposed discrete charge storage areas; and means for shifting between a first operating mode wherein said first and second components are applied to said conductor arrays and a second operating mode wherein said third and fourth components are applied to said conductor arrays, whereby the relatively high and relatively low sustainer components are interchanged between the arrays.

14. A circuit according to claim 13 wherein said first generating means includes means to pull-up said first sustaining voltage component to a high value, and means to pull down said first sustaining voltage component to a low value; wherein said fourth generating means includes means to pull-up said fourth sustaining voltage component to a high value, and means to pull-down said fourth sustaining voltage component to a low value, and wherein said means for applying said first and fourth components to said first conductor array includes a first plurality of display connector lines each connected to a conductor of said first array; a pull-up, unidirectionally conductive device connected between said first and fourth voltage pull-up means and a display connector line of said first plurality and poled to pass current from said voltage pull-up means to said display connector line; and a pull-down, unidirectionally conductive device connected between said first and fourth voltage pull-down means and a display connector line of said first plurality to which a pull-up, unidirectionally conductive device is connected, said pull-down device being poled to pass current from said display connector line to said first and fourth voltage pull-down means.

15. A circuit according to claim 14 wherein said means to pull-up said first and fourth sustaining voltage components comprise a single pull-up means.

16. A circuit according to claim 14 wherein said second generating means includes means to pull up said second sustaining voltage component to a value above the low value of said first sustaining voltage component, and means to pull-down said second sustaining voltage component to a low value below the low value of said first sustaining voltage component; wherein said third generating means includes means to pull up said third sustaining voltage component to a value above the low value of said first sustaining voltage component, and means to pull-down said third sustaining voltage component; and wherein said means for applying said second and third components to said second conductor array includes a second plurality of display connector lines each connected to a conductor of said second array, pull-up undirectionally conductive device connected between said second and third voltage pull-up means and a display connector line of said first plurality and poled to pass current from said voltage pull-up means to said display connector line, and a pull-down unidirectionally conductive device connected between said second and third voltage pull-down means and a display connector line of said first plurality to which a pull-up, unidirectionally conductive device is connected, said pull-down device being poled to pass current from said display connector line to said second and third voltage pull-down means.

17. A circuit according to claim 16 wherein said means to pull-up said first and fourth sustaining voltage components comprise a single pull-up means, and wherein said means to pull-up said second and third sustaining voltage components comprise a single pull-up means.

18. A circuit according to claim 16 including an addressing circuit for selecting individual ones of said conductors of said first and second arrays; addressing unidirectional voltage pulse generator means controlled by said addressing circuit for producing a pair of opposite polarity unidirectional pulses on selected conductors of said first and second arrays, each having a time duration relatively short with respect to a cycle of said periodic alternating sustaining voltage, and each being poled toward said low value of said first sustaining voltage component and of a magnitude to bring said selected conductors to said low value; means to apply the pulse of a decreasing value to the electrode of said array then at a high sustainer voltage component; means to actuate said shifting means to transfer from said first operating mode to said second operating mode in time sequence with said addressing means, whereby the discharge state of the cells in said panel are inverted to place normally "off" cells in the on state, prior to actuation of said addressing voltage pulse generator to issue pulses which transfer a selected cell in the on state to the off state; and means to actuate said shifting means to transfer from said second operating mode to said first operating mode subsequent to the actuation of said addressing voltage pulse generator whereby said selected cell is placed in the on state.

19. A circuit according to claim 16 wherein said low value of said first and third sustainer voltage components are like "reference voltages," said high value of said first, second, third and fourth sustainer voltage components are like voltages $V_H$, and said low value of said second and fourth sustainer voltage components are like voltages $V_l$, including first and second pull-up busses connecting respectively said first and second pull-up means to display connector lines connected to said conductors of said first and second arrays respectively; first and second pull-down busses connecting respectively said first and second pull-down means to display connector lines connected to said conductor of said first and second arrays respectively; and means for clamping the voltage levels on said conductors with respect to displacement currents in said array comprising a source of voltage $V_L$, a source of voltage $V_H$, unidirectionally conductive devices connecting said source of voltage $V_L$ to each of said first said second pull-up busses and poled to pass current from said source to said busses, and unidirectionally conductive devices connecting said source of voltage $V_H$ to each of said first and second pull-down busses and poled to pass current from said busses to said source.

20. A circuit according to claim 16 wherein said low value of said first and third sustainer voltage components are like reference voltages including first and second pull-up busses connecting respectively said first and second pull-up means to display connector lines connected to said conductors of said first and second arrays respectively; normally open switch means connected between a source of said reference voltage and said first and second pull-up busses; unidirectionally conductive devices connected serially with said switch means between said source of said reference voltage and said first and second pull-up busses and poled to pass current from said source to said pull-up busses whereby displacement currents across said panel are accommodated selectively; and means for selectively operating said switch means to its closed condition coincident with transitions of said sustainer components to said reference voltage levels.

21. A circuit according to claim 16 wherein said low value of said first sustainer voltage component is a reference voltage including: addressing unidirectional voltage pulse generating means or producing positive going unidirectional pulses, each having a time duration relatively short with respect to a cycle of said periodic alternating sustaining voltage and of a magnitude to draw the voltage on any conductors to which it is applied near said reference voltage; addressing unidirectional voltage pulse generator means for producing negative going unidirectional pulses, each having a time duration relatively short with respect to a cycle of said periodic alternating sustaining voltage and of a magnitude to draw the voltage on any conductors to which it is applied near said reference voltage; means to connect each generator of positive going pulses to a correlated display connector line for conductors in each of said arrays and to apply said pulses only to that display connector line for conductors which are at a low voltage relative to said reference voltage; means to connect each generator of negative going pulses to a correlated display connector line for conductors in each of said arrays and to apply said pulses only to that display connector line for conductors which are at a high voltage relative to said reference; and an addressing circuit for actuating individual ones of said addressing pulse generator means.

22. A circuit according to claim 21 wherein said individual pulse generator means are a source of said reference voltage and a normally open switch selectively closed by actuation of said addressing circuit; wherein said means to connect each of said generators of positive going pulses to said respective display connector lines of said first and second arrays are unidirectionally conductive devices connecting said generator to each of said respective display connector lines and poled to pass current from said generator to said display connector lines; and wherein said means to connect each of said generators of negative going pulses to said respective display connector lines of said first and second arrays and unidirectionally conductive devices connecting said generator to each of said respective display connector lines and poled to pass current from said display connector lines to said generator.

23. A circuit according to claim 16 wherein said first and third sustaining voltage components each have a like low voltage, including an addressing circuit for selecting individual ones of said conductors of said first and second arrays; addressing unidirectional voltage pulse generator means controlled by said addressing circuit for producing a pair of opposite polarity unidirectional pulses on selected conductors of said first and second arrays, each having a time duration relatively short with respect to a cycle of said periodic alternating sustaining voltage, and each being poled toward said low value of said first sustaining voltage component and of a magnitude to bring said selected conductors to said low value whereby a cell comprised of said pulsed conductors of said first and second arrays is placed in an off discharge state.

24. A circuit according to claim 23 including first and second pull-up busses connecting respectively said first and second pull-up means to display connector lines connected to said conductors of said first and second arrays respectively; first and second pull-down busses connecting respectively said first and second pull-down means to display connector lines connected to said conductors of said first and second arrays respectively; unidirectional voltage pulse generating means controlled by said addressing circuit for producing negative going pulses on said pull-up busses and positive going pulses on said pull-down busses of a magnitude to pull said busses near said low value of said first sustaining voltage component at a time prior to operation of said addressing pulse generators for selected display connector lines; unidirectionally conductive device connecting said unidirectional voltage pulse generating means for negative going pulses to each of said first and second pull-up busses and poled to pass current from said busses to said generating means; and unidirectionally conductive device connecting said unidirectional voltage pulse generating means for positive going pulses to each of said first and second pull-down busses and poled to pass current from said generating means to said busses.

25. A circuit according to claim 24 including means for sensing the voltage levels on said busses for indicating said busses are within a predetermined range of said low value of said first sustaining voltage component.

26. A circuit according to claim 20 including means to issue an enabling signal to said addressing unidirectional voltage pulse generating means for producing pulses on selected display connector lines in response to the reduction of said voltages on said busses to said predetermined range.

27. In a circuit for controlling a multicelled, gas discharge, display/memory panel of the type in which a discharge in an enclosed ionizable gas generates charges of alternate sign collectable on discrete areas of dielectric surfaces which are backed by portions of conductors of first conductor array which are proximate portions of conductors of a second conductor array, each of said proximate portions of respective conductors of said first and second arrays defining a discharge cell: means for imposing an alternating sustaining voltage between said first and second arrays whereby said first array is at a relatively high voltage during first time intervals in which said second array is at a relatively low voltage and said first array is at a relatively low voltage during second time intervals in which said second array is at a relatively high voltage; a first plurality of display connector lines each connected to a conductor of said first array; a second plurality of display connector lines each connected to a conductor of said second array; addressing pulsers to pull the voltage on a display connector line in a given direction toward a value intermediate said relatively high and relatively low voltages; a first unidirectional conductive means coupling each addressing pulser to a respective first display connector line and poled to pass signals to said display connector line when said display connector line has a voltage displaced opposite said given direction from said intermediate value; a second unidirectional conductive means coupling each addressing pulser to a respective second display connector line and poled to pass signals to said display connector line when said display connector line has a voltage displaced opposite said given direction from said intermediate value; and an addressing circuit for selectively actuating said pulsers in synchronism with the first and second time intervals of said sustaining voltage whereby only that display connector line pulser which has a voltage displaced opposite said given direction from said intermediate value has its voltage pulled in said given direction toward said intermediate value.

28. A circuit according to claim 27 wherein said addressing pulsers are pull-down pulsers and said oppositely displaced voltage is above said intermediate value.

29. A circuit according to claim 27 wherein said addressing pulsers are pull-up pulsers and said oppositely displaced voltage is below said intermediate value.

30. A circuit according to claim 27 including second addressing pulsers to pull the voltage on a display connector line in a second direction opposite said given direction toward a value intermediate said relatively high and relatively low voltages; a third unidirectional conductive means coupling each second addressing pulser to respective ones of at least some of said first display connector lines and poled to pass signals to said display connector line when said display connector line has a voltage displaced opposite said second direction from said intermediate value; a fourth unidirectional conductive means coupling each second addressing pulser to respective ones of at least some of said second display connector lines and poled to pass signals to said display connector line when said display connector line has a voltage displaced opposite said second direction from said intermediate value; and wherein said addressing circuit selectively actuates said second pulsers in synchronism with the first and second time intervals of said sustaining voltage.

31. In a circuit for controlling a multicelled, gas discharge, display/memory panel of the type in which a discharge in an enclosed ionizable gas generates charges of alternate sign collectible on discrete areas of dielectric surfaces which are backed by portions of conductors of a first conductor array which are proximate portions of conductors of a second conductor array, each of said proximate-portions of respective conductors of said first and second arrays defining a discharge cell: first and second means for applying a first periodic pulsating sustaining voltage component of a first amplitude based upon a reference voltage respectively to said first conductor array and to said second conductor array; third and fourth means for applying a second periodic pulsating sustaining voltage component respectively to said first conductor array and to said second conductor array, said second sustaining voltage component being of a second amplitude greater than said first amplitude, including excursions above and below said reference voltage, and of an amplitude which when added to the first amplitude at least equals the sustaining voltage for said cells; first means for actuating said first and third applying means simultaneously; second means for actuating said second and fourth means simultaneously; and means for shifting between said first and second actuating means.

32. A circuit according to claim 31 including means for causing said first sustaining voltage component to be out of phase with said second sustaining voltage component whereby the excursions of said components are on opposite sides of said reference voltage during a given interval; an addressing circuit for selecting individual ones of said conductors of said first and second arrays; and unidirectional voltage pulse generator means controlled by said addressing circuit for producing a pair of opposite polarity unidirectional pulses on selected conductors of said first and second array, each pulse being said reference voltage and of a time duration relatively short with respect to a cycle of said periodic sustaining voltage.

33. A circuit according to claim 32 wherein control by said first actuating means is the normal operating mode for said panel and including a sequencing control for said shifting and actuating means for first shifting to said second actuating means, then actuating a pulse generator means by said addressing means while said second actuating means is effective, and then actuating said shifting means to shift to said first actuating means whereby the panel discharge states are inverted, a selected cell is transferred to off discharge state and said panel discharge states are reinverted to place said selected cell in an on discharge state.

34. A circuit according to claim 31 including means for actuating said shifting means at time intervals to periodically invert the discharge state of cells of said panel.

35. A circuit according to claim 34 wherein successive actuations of said shifting means are at time intervals of different length whereby one state of discharge of cells of said panel predominates over the opposed state of discharge.

36. In a circuit for controlling a multicelled, gas discharge, display/memory panel of the type in which a discharge in an enclosed ionizable gas generates charges of alternate sign collectible on discrete areas of dielectric surfaces which are backed by portions of conductors of a first conductor array which are proximate portions of conductors of a second conductor array, each of said proximate portions of respective conductors of said first and second arrays defining a discharge cell: means for applying a first level periodic alternating sustaining voltage across said first and second conductor arrays; means for selectively shifting said sustaining voltage to a second level to invert the discharge state of all cells comprised of conductors of said first and second conductor arrays; address pulser means to apply signals opposing sustaining voltage levels on selected individual pairs of opposed conductors comprising discharge cells, said applied signals being of a magnitude to transfer said discharge cells from an on state of discharge to an off state of discharge; cell erase means to actuate said address pulser means for selected cells while said means for applying the first level sustaining voltage is operating; and cell write means to actuate said means for shifting the sustaining voltage to the second level and to actuate said address pulser means for selected cells during operation said shifting means and subsequent to operation of said address pulser terminate operation of said shifting means and operate said means for applying the first level of sustaining voltage, whereby the selected cells are transferred from an off state of discharge to an on state of discharge.

* * * * *